US007931162B2

(12) United States Patent
Swanson et al.

(10) Patent No.: US 7,931,162 B2
(45) Date of Patent: Apr. 26, 2011

(54) REGULATOR BRACKET FOR USE WITH A RACK HAVING INTEGRATED MOUNTING MEANS

(75) Inventors: Craig A. Swanson, Canyon Lake, TX (US); Phillip Frazier, Helotes, TX (US); Francis Santos, San Antonio, TX (US)

(73) Assignee: Taprite-Fassco Manufacturing, Inc., San Antonio, TX (US)

( * ) Notice: Subject to any disclaimer, the term of this patent is extended or adjusted under 35 U.S.C. 154(b) by 573 days.

(21) Appl. No.: 11/856,948

(22) Filed: Sep. 18, 2007

(65) Prior Publication Data

US 2008/0001054 A1 Jan. 3, 2008

Related U.S. Application Data

(63) Continuation-in-part of application No. 11/211,859, filed on Aug. 25, 2005, now Pat. No. 7,870,966, and a continuation-in-part of application No. 29/256,121, filed on Mar. 16, 2006.

(60) Provisional application No. 60/915,847, filed on May 3, 2007, provisional application No. 60/685,463, filed on May 27, 2005.

(51) Int. Cl.
 *A47B 43/00* (2006.01)
(52) U.S. Cl. ...................................... 211/194
(58) Field of Classification Search ............... 211/86.01, 211/189, 71.01, 194, 188, 186, 128.1, 85.4, 211/90.01; 222/129.1; D15/7; 417/313
 See application file for complete search history.

(56) References Cited

U.S. PATENT DOCUMENTS

| 1,546,576 | A | * | 7/1925 | Erwin et al. | 169/35 |
| 1,778,992 | A | * | 10/1930 | Wulfert | 248/635 |
| 2,400,807 | A | | 5/1946 | Burkhard | |
| 2,873,082 | A | * | 2/1959 | Gillespie | 248/300 |
| 2,988,315 | A | | 6/1961 | Saxe | |
| 3,487,951 | A | | 1/1970 | Baltzung | |
| D218,834 | S | * | 9/1970 | Smith et al. | D8/380 |
| 3,602,159 | A | | 8/1971 | Marschak | |
| 3,879,068 | A | | 4/1975 | Stampfli | |
| 3,888,353 | A | | 6/1975 | Leifheit | |
| 4,247,133 | A | | 1/1981 | Moller | |
| 4,426,008 | A | | 1/1984 | Olsen et al. | |
| 4,441,684 | A | * | 4/1984 | Credle, Jr. | 248/674 |

(Continued)

FOREIGN PATENT DOCUMENTS

WO    WO 87/07236    3/1987

OTHER PUBLICATIONS

U.S. Appl. No. 29/284,907, filed Sep. 18, 2007, Swanson.

(Continued)

*Primary Examiner* — Sarah Purol
(74) *Attorney, Agent, or Firm* — Greenberg Traurig, LLP

(57) ABSTRACT

A novel type of sliding mount bracket, referenced herein as a regulator bracket, is adapted to be removably attached to a regulator. The regulator bracket includes a base and securing means for attaching the base to a panel that has louvers to receive the edges of the bracket. The regulator bracket further includes anchoring means for attaching the base to the regulator so as to inhibit movement thereof. Thus, when the regulator is secured to the rack, a display surface of the regulator is maintained in a fixed position, in which it is visually perceptible to the restaurateur or other user.

8 Claims, 16 Drawing Sheets

U.S. PATENT DOCUMENTS

| | | | |
|---|---|---|---|
| 4,558,838 A * | 12/1985 | Klein | 248/235 |
| D298,604 S * | 11/1988 | Newton | D8/380 |
| 5,016,765 A | 5/1991 | Leonardo | |
| D320,521 S | 10/1991 | Baur | |
| 5,314,091 A * | 5/1994 | Credle, Jr. | 222/129.1 |
| 5,379,976 A | 1/1995 | DeGirolamo | |
| D357,923 S * | 5/1995 | Peterson et al. | D15/9.1 |
| 5,417,401 A * | 5/1995 | Thompson et al. | 248/674 |
| 5,480,288 A * | 1/1996 | Hellenberg et al. | 417/313 |
| 5,492,455 A * | 2/1996 | Durham et al. | 417/313 |
| 5,624,167 A * | 4/1997 | Katz | 312/223.1 |
| D388,439 S | 12/1997 | Cantley et al. | |
| D410,470 S * | 6/1999 | Filipek et al. | D15/7 |
| 6,050,662 A * | 4/2000 | Filipek et al. | 312/352 |
| 6,123,208 A | 9/2000 | Haenszel | |
| 6,161,708 A | 12/2000 | Myler | |
| D438,741 S | 3/2001 | Murphy | |
| 6,241,106 B1 | 6/2001 | Fujita et al. | |
| 6,267,268 B1 * | 7/2001 | Quartarone et al. | 222/129.1 |
| D446,414 S | 8/2001 | Schafer | |
| D446,968 S | 8/2001 | Spencer | |
| 6,435,357 B1 * | 8/2002 | Lee | 211/70.6 |
| 6,530,486 B1 | 3/2003 | Batting et al. | |
| 6,547,100 B2 * | 4/2003 | Phillips et al. | 222/129.1 |
| 6,834,768 B2 | 12/2004 | Jersey et al. | |
| D512,254 S | 12/2005 | Ottens | |
| 7,225,936 B2 * | 6/2007 | Jersey et al. | 211/189 |
| D556,546 S * | 12/2007 | Swanson et al. | D8/354 |
| D569,158 S * | 5/2008 | Chou | D6/580 |
| 7,597,204 B2 * | 10/2009 | Jersey et al. | 211/189 |
| D616,727 S * | 6/2010 | Chou | D8/354 |
| 2002/0117462 A1 | 8/2002 | Hung | |
| 2004/0245200 A1 * | 12/2004 | Jersey et al. | 211/189 |
| 2005/0006329 A1 | 1/2005 | Williquette | |
| 2006/0266726 A1 | 11/2006 | Swanson | |

OTHER PUBLICATIONS

Taprite-Fassco, Bag-in-Box Rack Catalog Sheets (Jan. 1998).

* cited by examiner

REGULATOR BRACKET FOR USE WITH A RACK HAVING INTEGRATED MOUNTING MEANS

CROSS-REFERENCE TO RELATED APPLICATIONS

The present application claims the benefit of U.S. Provisional Patent Application No. 60/915,847, filed on May 3, 2007. The present application is also a continuation-in-part of U.S. patent application Ser. No. 11/211,859, filed on Aug. 25, 2005 now U.S. Pat. No. 7,870,966, which claims the benefit of U.S. Provisional Patent Application 60/685,463, fled on May 27, 2005, and is a continuation-in-part of co-pending U.S. Design Patent Application No. 29/256,121, filed on Mar. 16, 2006. All of the aforementioned applications are hereby incorporated by reference in their entireties for all purposes.

FIELD OF THE INVENTION

The present invention relates generally to racks for storing bag-in-box containers, and, more particularly, to such racks having a modular design and integrated mounting means for peripheral devices (i.e., accessories) such as components of fluid-dispensing systems. The present invention also relates to a regulator and a mounting bracket thereof.

BACKGROUND OF THE INVENTION

It is known in the art to use bag-in-box (BIB) containers for the storage of syrup, juice concentrate, and other liquids. BIB containers are generally box-shaped and have a bag positioned therein for containing the liquid. A restaurateur (or any other person) can use a BIB container in connection with a pump and one or more canisters of soda water, for example, to form a carbonated beverage and to convey the carbonated beverage to a dispenser.

It is also known in the art to have multi-shelf racks for storing BIB containers. Such racks typically use "level" shelving (e.g., shelves that are substantially parallel with the ground) and "inclined" shelving (e.g., shelves that are substantially angled with respect to the ground). A restaurateur ordinarily makes the choice between level and inclined shelving depending on the requests of the manufacturer of the syrup. For example, one major cola manufacturer requests that restaurateurs store their BIB containers on level shelving, while another major cola manufacturer requests that restaurateurs store their BIB containers on inclined shelving.

It is further desirable to mount peripheral devices from BIB container racks. For example, a variety of fluid-dispensing components, such as comestible fluid-dispensing conduits, valves, pumps, filters, and regulators, may be mounted to rails of a comestible fluid rack. When mounting a regulator, it is desirable to mount its associated pressure gauge in a position that will be visually perceptible by the restaurateur. What is needed in the art is a modular rack that facilitates easy disassembly and transport thereof and that facilitates the easy mounting of peripheral devices thereto. What is also needed in the art is a regulator bracket for mounting a regulator to a rack so as to inhibit inadvertent motion of the regulator.

SUMMARY OF THE INVENTION

The present invention provides a modular rack for attachment thereto of a sliding mount bracket securable to a peripheral device, such as a comestible fluid-dispensing conduit, valve, pump, filter, or regulator. The modular rack includes one or more modular shelves, wherein at least one of the modular shelves includes a plurality of subassemblies and a plurality of intra-shelf connectors, each securing one of the subassemblies to another one of the subassemblies adjacent thereto. At least one of the subassemblies preferably includes an end panel having louvers formed therein for receiving the sliding mount bracket.

In accordance with a first exemplary embodiment of the invention, the modular rack includes at least one modular shelf having a left-end subassembly, a right-end subassembly, and a middle subassembly, each of which includes a front frame member aligned along a front axis and a rear frame member aligned along a rear axis. The modular shelf includes a plurality of intra-shelf connectors securing the frame members of the middle subassembly to the frame members of the two end subassemblies. The modular shelf further includes a plurality of support members securing the rear frame member of the middle subassembly to the front frame member of the middle subassembly so as to support a BIB container thereon.

In the first exemplary embodiment of the invention, the front axis has a lower elevation than the rear axis. In this regard, a BIB container may be positioned on the support members at an angle with respect to ground level. In the first exemplary embodiment of the invention, the modular frame includes stop means to prevent the BIB container from moving downwardly.

Each of the end subassemblies preferably includes mounting means for securing one or more peripheral devices thereto. The mounting means preferably includes louvers formed in the respective end panels thereof. Each louver comprises a slat formed from a metal sheet of the end panel corresponding therewith and further comprises an aperture corresponding thereto. The louvers are sized and positioned to receive a sliding mount bracket that is attachable to a peripheral device, such as a conduit, valve, pump, filter, regulator, etc. In some embodiments of the invention, the louvers are not required. The left-end subassembly and/or the right-end subassembly can include other mounting means, such as brackets installed on the end panels, or no mounting means.

The modular rack may further include an additional modular shelf and a plurality of inter-shelf connectors securing the modular shelf atop the additional modular shelf. The right-end subassembly and the left-end subassembly of the additional modular shelf include front and rear leg members having female connection ends. The inter-shelf connectors mate with the female connection ends of the front and rear leg members of the two modular shelves to secure their corresponding leg members in axial alignment with one another. In some embodiments of the invention, the modular rack comprises more than two modular shelves. The two modular shelves are preferably interchangeable (e.g., the inter-shelf connectors can secure the additional modular shelf atop the modular shelf.

The modular rack may further comprise a peripheral device support subassembly and additional inter-shelf connectors adapted to secure the peripheral device support subassembly to a modular shelf positioned therebelow or thereabove. The peripheral device support subassembly includes one or more rear-end panels, as well as mounting means for securing a peripheral device, such as a conduit, valve, pump, filter, or regulator, thereto. The mounting means preferably includes louvers formed in the rear-end panel. Each louver comprises an aperture and a slat formed from a metal sheet of the rear-end panel corresponding therewith, and the louvers are sized and positioned to receive a sliding mount bracket. In some embodiments of the invention, the louvers are not required, and the peripheral device support subassembly includes other mounting means, such as slots and/or brackets, or no mounting means.

In accordance with a second exemplary embodiment of the invention, the modular rack includes at least one modular shelf having a left-end subassembly, a right-end subassembly, and a middle subassembly, each of which includes a front frame member aligned along a front axis and a rear frame member aligned along a rear axis. The elevation of the front axis and the elevation of the rear axis are about equal. The modular shelf further includes a plurality of support members securing the rear frame member of the middle subassembly to the front frame member of the middle subassembly, whereby a BIB container positioned thereon can be leveled.

In accordance with a third exemplary embodiment of the invention, the modular rack includes a left-end subassembly which has a left-end panel, a right-end subassembly which has a right-end panel, a rear-end panel, and a movable front-end panel. A front brace member, extending horizontally between the two end subassemblies, secures and stabilizes the modular rack when the front-end panel is removed or rotated. All of the end panels include mounting means for securing a peripheral device thereto. The mounting means preferably includes louvers formed in the panels. Each louver comprises an aperture and a slat formed from a metal sheet of the end panel corresponding therewith. The louvers, which are sized and positioned to receive a sliding mount bracket, protrude inwardly towards the interior confines of the modular rack, thereby permitting peripheral devices to be mounted interiorly, within the modular rack.

The aforementioned modular rack is therefore suitable for locations where limited space surrounding the modular rack inhibits the mounting of peripheral devices on the exterior portions of the modular rack. More particularly, the peripheral devices, such as conduits, valves, pumps, filters, and regulators, may be mounted interiorly within the modular rack, rather then exteriorly on the outside of the modular rack. The modular rack is positioned (i.e., stacked) on top of one or more modular racks of the aforesaid first and/or second embodiments. This configuration positions the pump(s) which are mounted on the modular rack, above the liquids in the BIB containers which are mounted on modular racks of the aforesaid first and/or second embodiments, thereby preventing the flow of liquids through the pump(s) by way of gravity. The front-end panel may be removed from the modular rack, or rotated outwardly and downwardly, when the restaurateur wishes to access peripheral devices that are mounted interiorly within the modular rack.

The present invention also provides a novel type of sliding mount bracket, referenced herein as a regulator bracket, that is adapted to be removably attached to a regulator. The regulator bracket, in an exemplary embodiment thereof, includes a base and securing means for attaching the base to the louvers of the modular rack. The regulator bracket further includes anchoring means for attaching the base to the regulator so as to inhibit movement thereof. Thus, when the regulator is secured to the rack, a display surface of the regulator is maintained in a substantially fixed position, in which it is visually perceptible to the restaurateur or other user.

It should be understood that the relative terminology used herein, such as "front", "rear", "middle" "top", "bottom" "side", "inside", "outside", "left", "right", "horizontal", "vertical", etc., is solely for the purposes of clarity and designation and does not limit the scope of the present invention to structural embodiments having a certain position with respect to the environments thereof.

BRIEF DESCRIPTION OF THE DRAWINGS

For a more complete understanding of the present invention, reference is made to the following detailed description of various exemplary embodiments considered in conjunction with the accompanying drawings, in which.

DETAILED DESCRIPTION OF THE EXEMPLARY EMBODIMENTS

Figure 1:
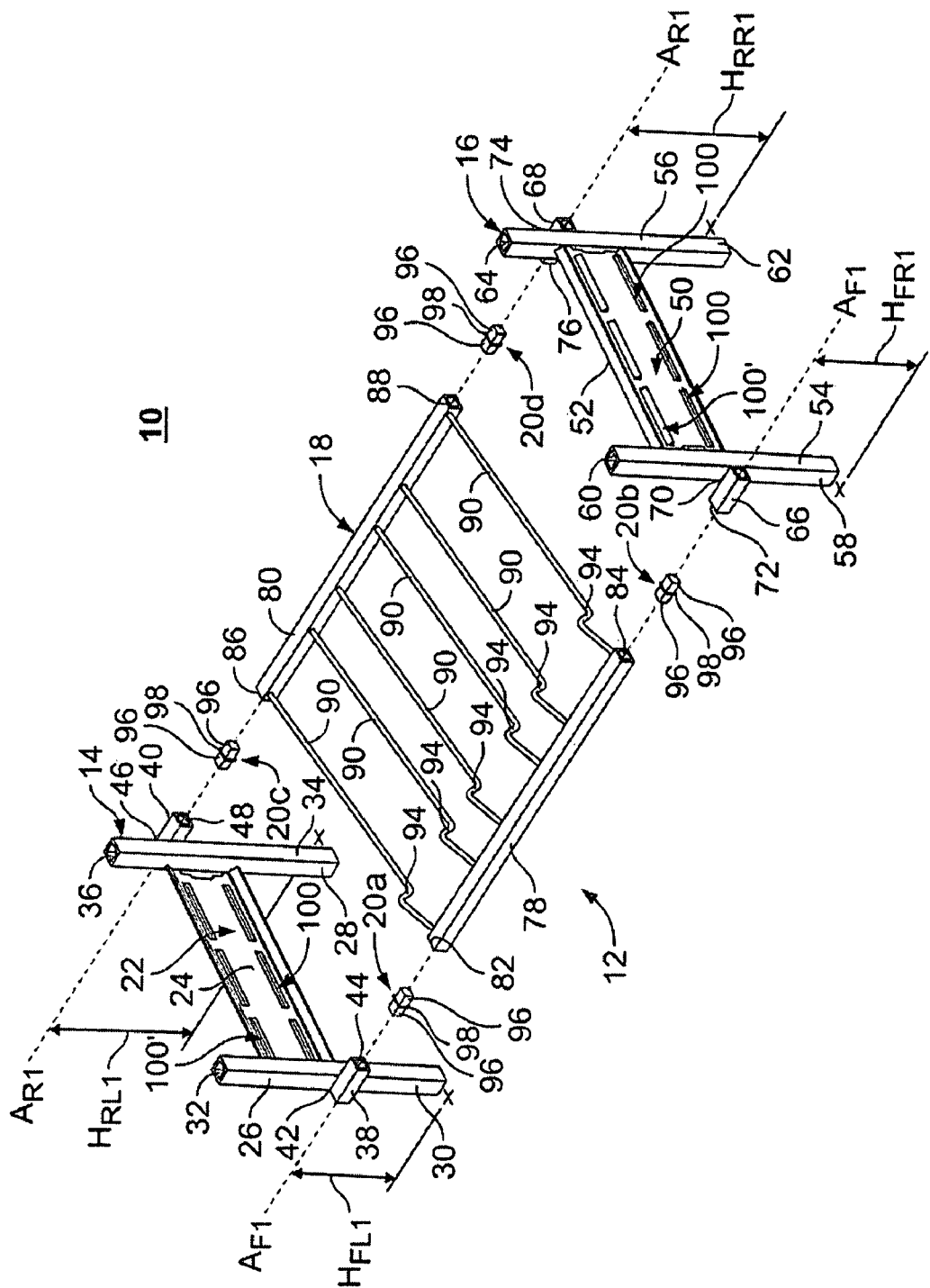
FIG. 1 is a horizontally-exploded perspective view showing a modular rack constructed in accordance with a first exemplary embodiment of the present invention, the modular rack including a single shelf of an inclined type.

Referring to FIG. 1, an exemplary modular rack 10 constructed in accordance with a first exemplary embodiment of the present invention is shown to include a single modular shelf 12. A BIB container (shown in FIG. 7) may be seated on the modular shelf 12 at an angle with respect to ground level, and the modular shelf 12 is therefore referenced herein as being of an inclined type. The modular shelf 12 includes a left-end subassembly 14, a right-end subassembly 16, at least one middle subassembly 18, and a plurality of intra-shelf connectors 20a-d that secure the middle subassembly 18 to the left-end subassembly 14 and the right-end subassembly 16.

The left-end subassembly 14 includes a left-end panel 22 that has an inside surface, referenced herein as a left-inside surface 24. The left-end subassembly 14 also includes a front-left leg member 26 and a rear-left leg member 28, each of which is preferably cut from square, steel tubing. The front-left leg member 26 is welded to the left-end panel 22, extends vertically therefrom, and has a hollow bottom end, referenced herein as a front-left base end 30, and a hollow top end, referenced herein as a front-left top end 32. The rear-left leg member 28 is welded to the left-end panel 22, extends vertically therefrom, and has a hollow bottom end, referenced herein as a rear-left base end 34, and a hollow top end, referenced herein as a rear-left top end 36.

The left-end subassembly 14 further includes a front-left frame member 38 and a rear-left frame member 40, each of which is preferably cut from square, steel tubing. The front-left frame member 38 is welded to the front-left leg member 26 to form a front-left juncture point 42. The front-left frame member 38 extends perpendicularly therefrom along a front axis $A_{F1}$ and terminates at an end referenced herein as a front-left female connection end 44. The rear-left frame member 40 is welded to the rear-left leg member 28 to form a rear-left juncture point 46. The rear-left frame member 40 extends perpendicularly therefrom along a rear axis $A_{R1}$ and terminates at an end referenced herein as a rear-left female connection end 48.

As discussed above, the modular shelf 12 of FIG. 1 is of an inclined type for supporting BIB containers at an angle with respect to ground level. In this regard, the distance between the front-left base end 30 and the front-left juncture point 42, referenced herein as distance $H_{FL1}$, is less than the distance between the rear-left base end 34 and the rear-left juncture point 46, which is referenced herein as distance $H_{RL1}$. Thus, in the modular shelf 12 of the inclined type, the front-left frame member 38 is closer to ground level than the rear-left frame member 40.

Continuing with reference to FIG. 1, the right-end subassembly 16 includes a right-end panel 50 that has an inside surface, referenced herein as a right inside surface 52. The right-end subassembly 16 includes a front-right leg member 54 and a rear-right leg member 56, each of which is preferably cut from square, steel tubing. The front-right leg member 54 is welded to the right-end panel 50, extends vertically therefrom, and has a hollow bottom end, referenced herein as a front-right base end 58, and a hollow top end, referenced herein as a front-right top end 60. The rear-right leg member 56 is welded to the right-end panel 50, extends vertically therefrom, and has a hollow bottom end, referenced herein as a rear-right base end 62, and a hollow top end, referenced herein as a rear-right top end 64.

The right-end subassembly 16 further includes a front-right frame member 66 and a rear-right frame member 68, each of which is preferably cut from square steel tubing. The front-right frame member 66 is welded to the front-right leg member 54 to form a front-right juncture point 70. The front-right frame member 66 extends perpendicularly relative to the front-right leg member 54 along the front axis $A_{F1}$ and terminates at an end referenced herein as a front-right female connection end 72. The rear-right frame member 68 is welded to the rear-right leg member 56 to form a rear-right juncture point 74. The rear-right frame member 68 extends perpendicularly therefrom along the rear axis $A_{R1}$ and terminates at an end referenced herein as a rear-right female connection end 76.

The distance between the front-right base end 58 and the front-right juncture point 70, referenced herein as distance $H_{FR1}$, is substantially equal to the distance $H_{FL1}$. The distance between the rear-right base end 62 and the rear-right juncture point 74, referenced herein as distance $H_{RR1}$, is substantially equal to the distance $H_{RL1}$. The distance $H_{FR1}$ is less than the distance $H_{RR1}$, such that the front axis $A_{F1}$ has a lower elevation than the rear axis $A_{R1}$; or, in other words, the front-right frame member 66 is closer to ground level than the rear-right frame member 68.

Continuing with reference to FIG. 1, the middle subassembly 18 includes a front-middle frame member 78 and a rear-middle frame member 80, each of which is preferably cut from square, steel tubing. The front-middle frame member 78 extends along the front axis $A_{F1}$ and terminates at a pair of female connection ends 82, 84. The rear-middle frame member 80 extends along the rear axis $A_{R1}$ and terminates at a pair of female connection ends 86, 88. As discussed above, the modular shelf 12 of FIG. 1 is of an inclined type, and the distance $H_{FR1}$ is less than the distance $H_{RR1}$. In this regard, the front frame members 38, 66, 78 have a lower elevation than the rear frame members 40, 68, 80.

Figure 7:
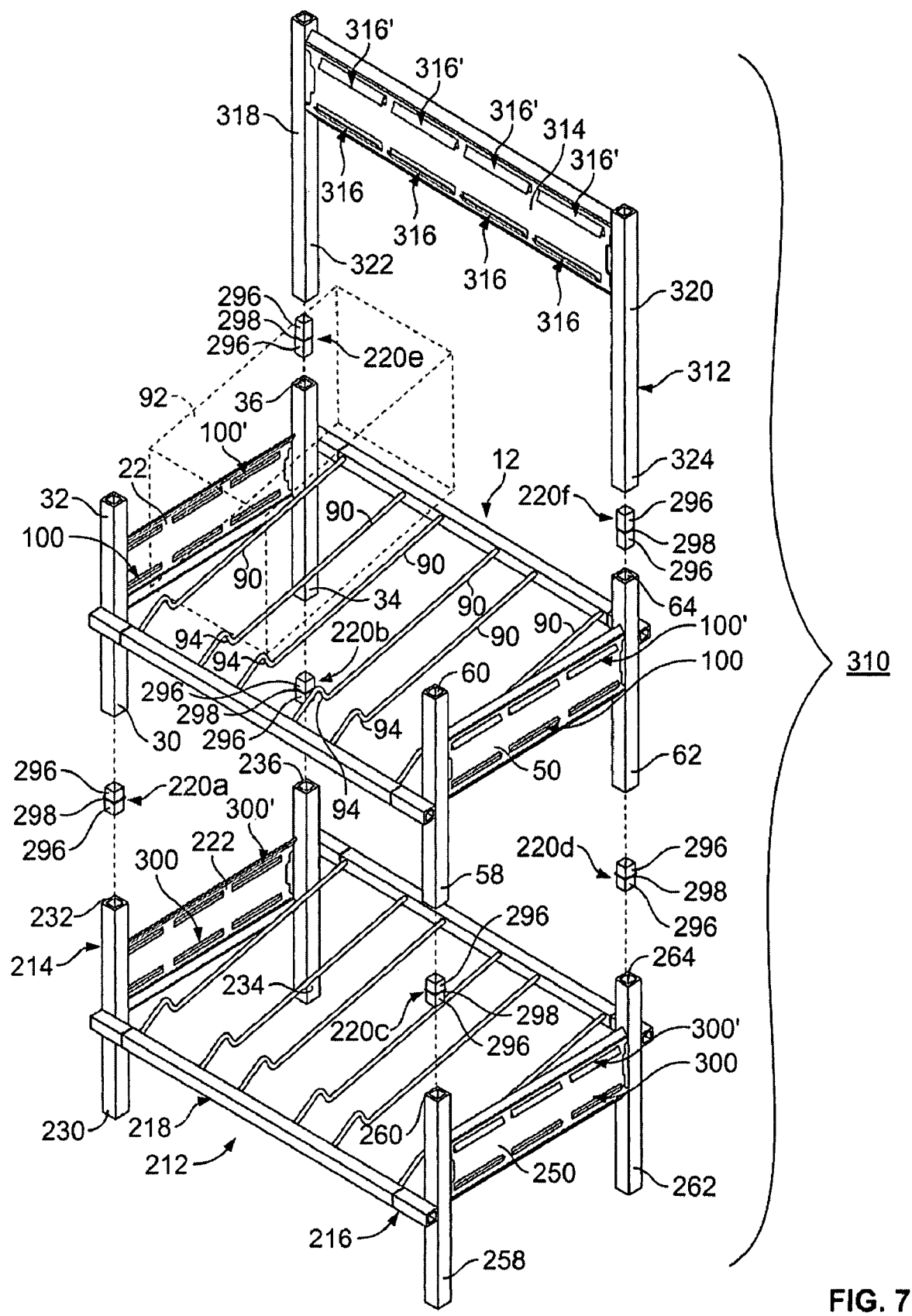
FIG. 7 is a vertically-exploded perspective view showing the modular shelf of FIG. 6 in combination with a peripheral device support subassembly.

The middle subassembly 18 further includes a plurality of support members 90, preferably formed from steel, that secure the front-middle frame member 78 to the rear-middle frame member 80 and that extend perpendicularly with respect to the front-middle frame member 78 and the rear-middle frame member 80. Because the front-middle frame member 78 has a lower elevation than the rear-middle frame member 80, the support members 90 slope downwardly from the rear-middle frame member 80 to the front-middle frame member 78. As shown in FIG. 7, at least one BIB container 92 may rest upon the support members 90, and the support members 90 have stopping means 94 formed therein to prevent the BIB container 92 from sliding forward. The stopping means 94 preferably includes a reverse-slope section formed in at least one of the support members 90, however, other means shall be clear to one skilled in the art (e.g., stop plate, stop flange, etc.).

The intra-shelf connectors 20a-d secure the middle subassembly 18 to the left-end subassembly 14 and the right-end subassembly 16. Each one of the intra-shelf connectors 20a-d is preferably, though not necessarily, a dual-male connector having two male connection ends 96 and a center flange 98 positioned therebetween. The center flange 98 of each one of the intra-shelf connectors 20a-d has the same dimensions, such as top and bottom width and front and rear height, and, preferably, the same appearance (e.g., color, etc.) as the frame members 38, 40, 66, 68, 78, 80, so as to blend with the surface appearance thereof. The length of each one of the intra-shelf connectors 20a-d is about four inches (4"), and the length of each one of the male connection ends 96 is about two inches (2"). However, the scope of the invention is not limited to embodiments thereof constructed in accordance with said dimensions.

The male connection ends 96 and the female connection ends 44, 48, 72, 76, 82, 84, 86, 88 are preferably modular, such that each one of the male connection ends 96 is sized and shaped to securingly mate with any one of the female connection ends 44, 48, 72, 76, 82, 84, 86, 88. In this regard, each one of the female connection ends 44, 48, 72, 76, 82, 84, 86, 88 has an opening formed therein that is sized and shaped to receive and conceal one of the male connections ends 96. In the exemplary embodiment of the invention shown in FIG. 1, a first one of the male intra-shelf connectors 20a secures the front-left frame member 38 to the front-middle frame member 78, a second one of the male intra-shelf connectors 20b secures the front-right frame member 66 to the front-middle frame member 78, a third one of the male intra-shelf connectors 20c secures the rear-left frame member 40 to the rear-middle frame member 80, and a fourth one of the male intra-shelf connectors 20d secures the rear-right frame member 68 to the rear-middle frame member 80.

Figure 2:
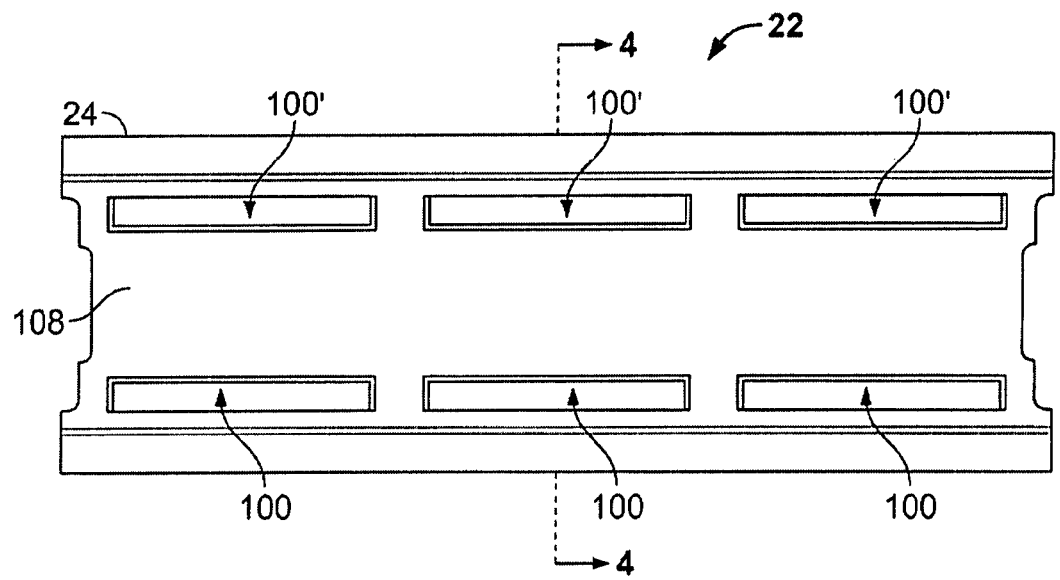
FIG. 2 is a left side view showing the left-end panel of FIG. 1.
Figure 3:
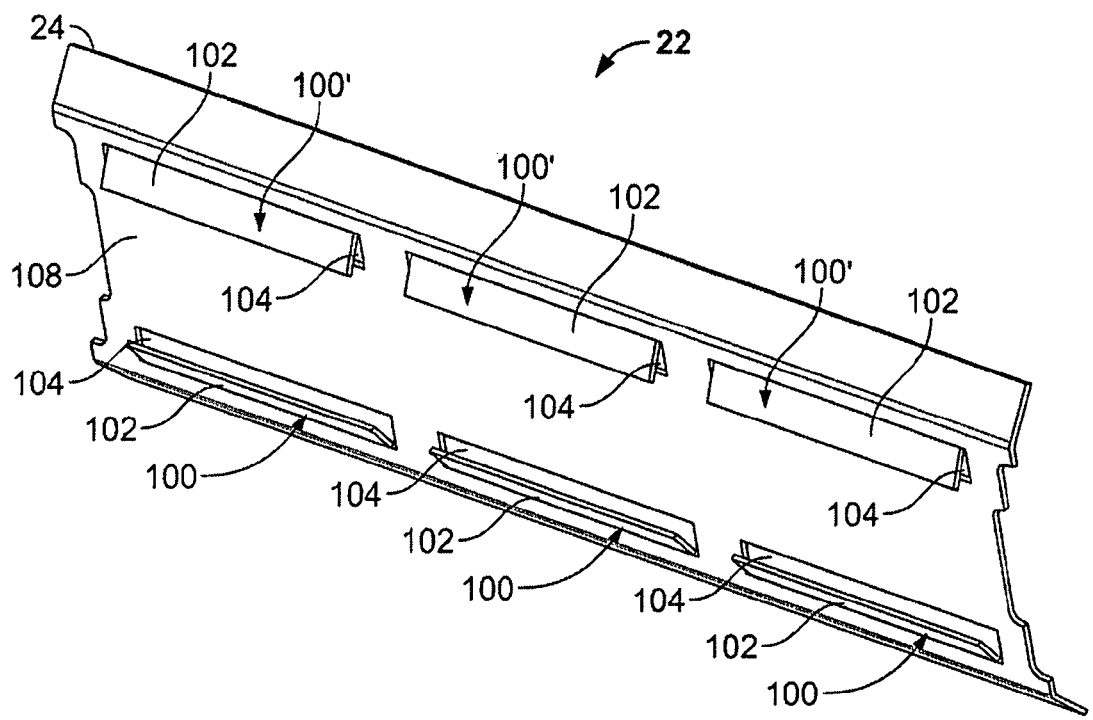
FIG. 3 is a perspective view showing the left-end panel of FIGS. 1 and 2.
Figure 4:
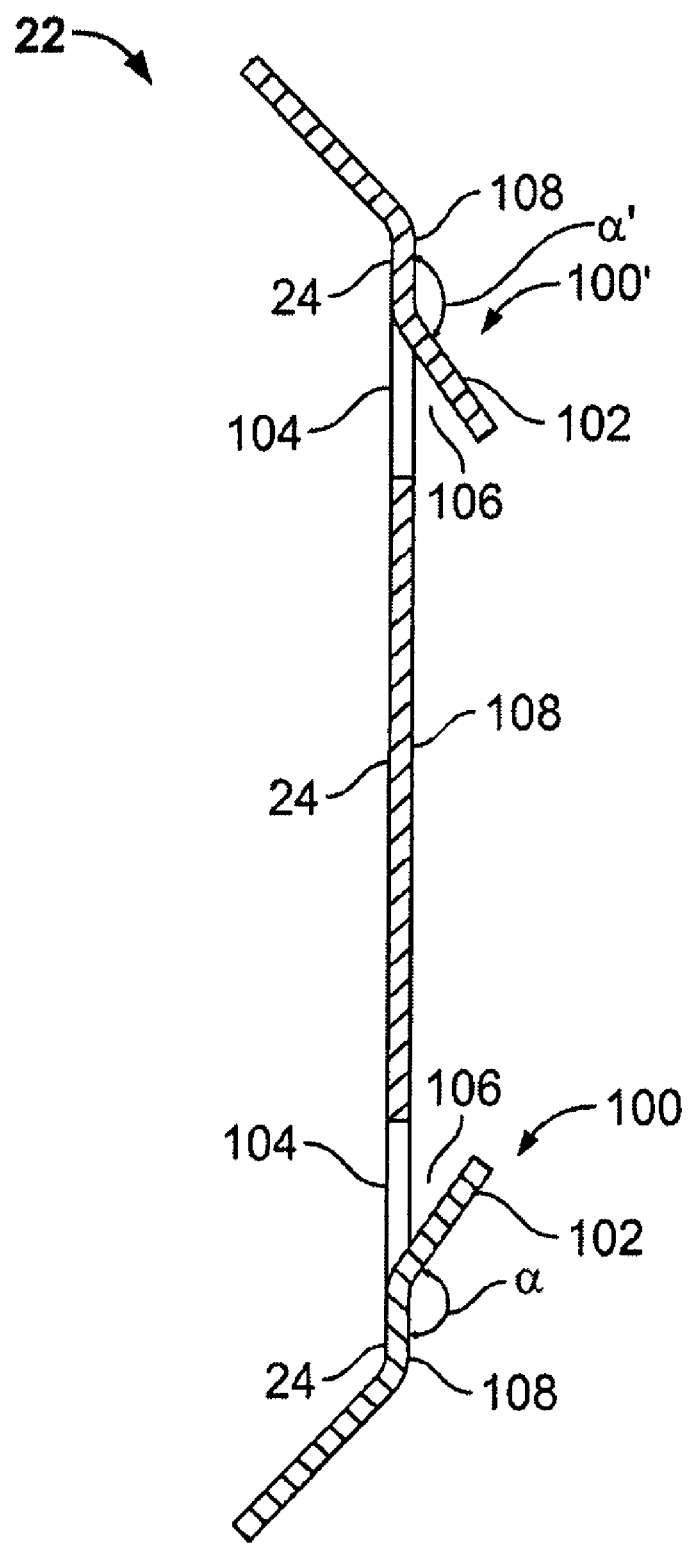
FIG. 4 is a cross-sectional view taken along section line 4-4 of FIG. 2.

With reference to FIGS. 2-4 the left-end panel 22 of the modular shelf 12 of FIG. 1 shall now be discussed with further detail. In the following discussion, it should be understood that, in the exemplary embodiments of the invention, the right-end panel 50 is a mirror image of the left-end panel 22.

Figure 6:
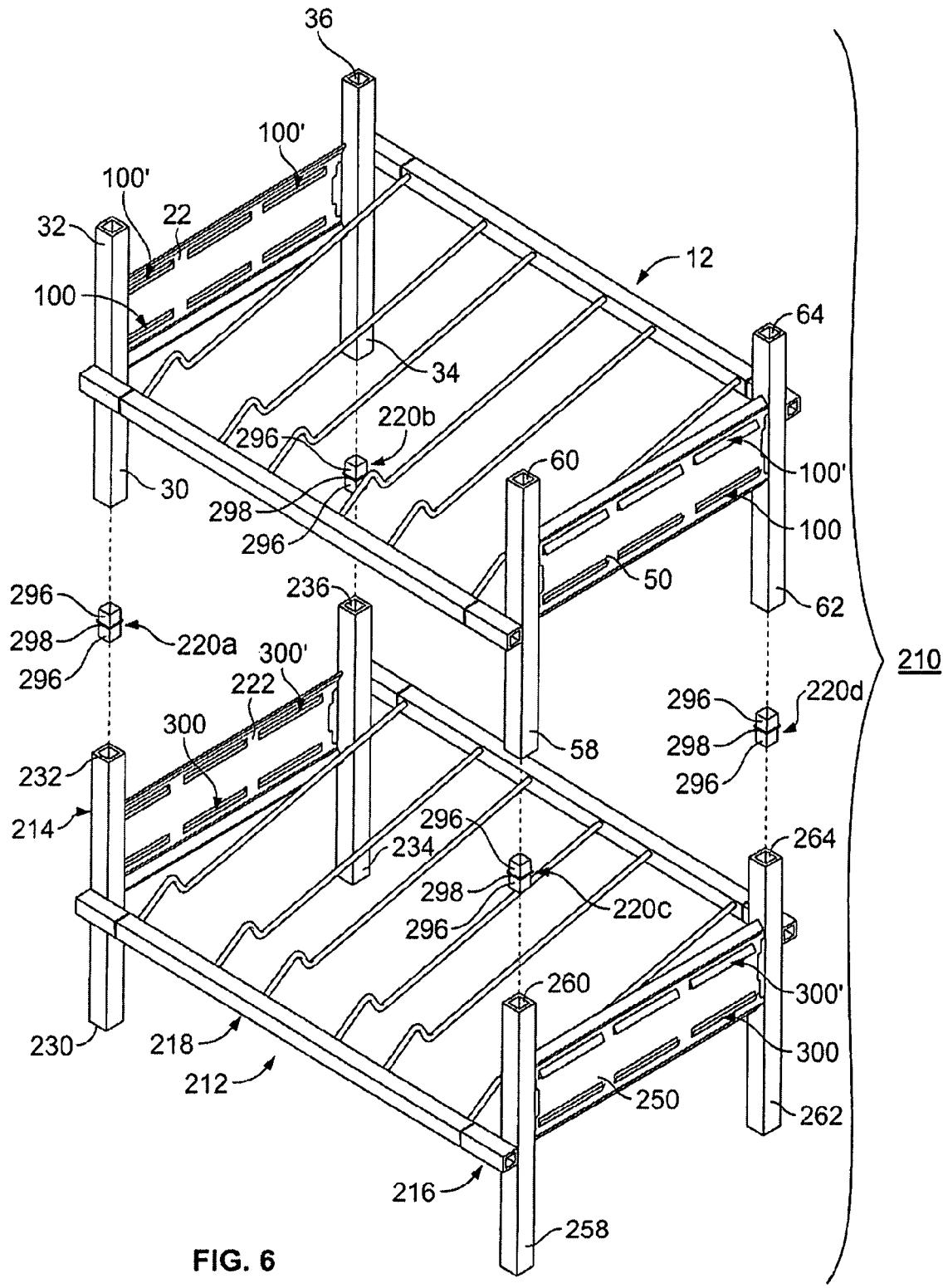
FIG. 6 is a vertically-exploded perspective view showing the modular shelf of FIG. 1 in combination with an additional modular shelf of the inclined type.

The left-end panel 22 has a plurality of louvers 100, 100' formed therein. The left-end panel 22 is preferably formed from a metal sheet, and each one of the louvers 100, 100' is formed by punching or cutting the metal sheet. Each one of the louvers 100, 100' includes a slat 102, an aperture 104, and a receiving area 106 positioned therebetween. Each aperture 104 is formed in the left-end panel 22 corresponding to where the metal sheet had been punched or cut, and the dimensions of each aperture 104 (e.g., length, width, thickness) are substantially equal to the dimensions of the slat 102 corresponding therewith. The left-end panel 22 has an outside surface, referenced herein as a left-outside surface 108, and each one of the louvers 100, 100' extends from the left outside surface 108, such that each receiving area 106 is easily accessible when a BIB container, such as the BIB container 92 shown in FIGS. 6-7, is supported by the modular shelf 12. The angles at which the slats 102 extend from the left-outside surface 108 are referenced herein as angles $\alpha$, $\alpha'$ and shall be discussed in detail below with reference to the exemplary regulator bracket of FIGS. 9-16.

Figure 5:
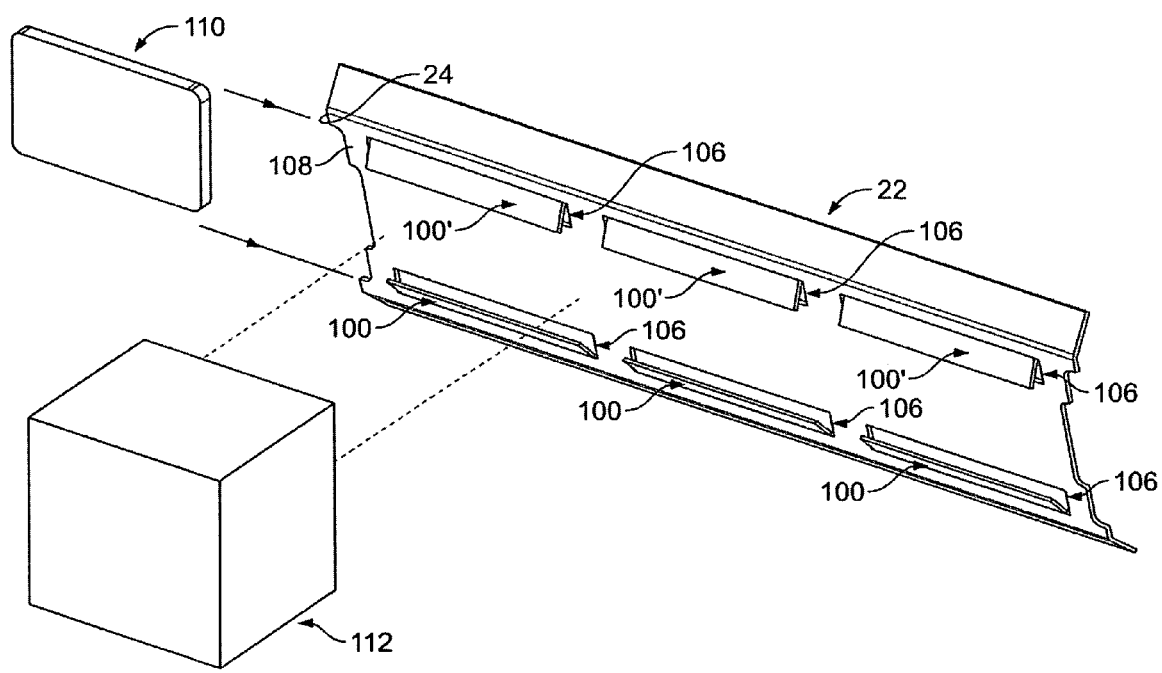
FIG. 5 is a partially exploded perspective view showing the left-end panel of FIGS. 2-5 with a schematic representation of a sliding mount bracket and a peripheral device.

Referring to FIG. 5, it can be seen that each one of the louvers 100' is paired with one of the louvers 100, such that the receiving areas 106 of the pair thereof securingly receive a sliding mount bracket 110 adapted for attachment to a peripheral device 112 (e.g., a fluid dispensing component, such as a comestible fluid conduit, valve, pump, filter, or regulator). The sliding mount bracket 110 and the peripheral device 112 are depicted schematically so as to represent a variety of possible peripheral device/mounting bracket combinations. One of the louvers 100 in the pair opens in a first direction, such as upwardly, and the other one of the louvers 100' in the pair opens in a second direction opposite the first direction, such as downwardly. The sliding mount bracket 110 is attached to the peripheral device 112 and, in preferred embodiments of the invention, the modular shelf 12 does not require any additional hardware to secure the sliding mount bracket 110 to the left-end panel 22.

FIG. 6 shows modular rack 210 having more than one modular shelf (i.e., the modular shelf 12 of FIG. 1 and another modular shelf, referenced herein as modular shelf 212). The modular shelf 212 is preferably similar to the modular shelf 12 in all respects except those noted herein, and elements of the modular shelf 212 that correspond substantially to the elements of the modular shelf 12 described above have been designated by corresponding reference numerals being increased by two hundred. In this regard, the modular shelf 212 preferably includes a left-end subassembly 214, a right-end subassembly 216, and a middle subassembly 218 secured therebetween. The modular shelf 212 further includes leg members having hollow ends, including a front-left base end 230, a front-left top end 232, a rear-left base end 234, a rear-left top end 236, a front-right base end 258, a front-right top end 260, a rear-right base end 262, and a rear-right top end 264.

A plurality of inter-shelf connectors 220a-f is provided to secure the modular shelf 12 atop the modular shelf 212 when the modular shelf 12 is modularly stacked thereon (as shown in FIG. 6) and/or when the modular shelf 212 is stacked on the modular shelf 12 (not shown). The modular rack 10 may include any suitable number of shelves, modular shelves, or combinations thereof.

The inter-shelf connectors 220a-d are preferably similar to the intra-shelf connectors 20a-d and each one is preferably formed from plastic. The inter-shelf connectors 220a-d are preferably a dual-male connector having a center flange 298 and a plurality of male connection ends 296 extending from opposing sides of the center flange 298. The length of each one of the inter-shelf connectors 220a-d is about two inches (2"), and the length of each one of the male connection ends 296 is about one inch (1"). However, the scope of the invention is not limited to embodiments of the invention constructed in accordance with such dimensions. Furthermore, it is not required that the inter-shelf connectors 220a-d and the intra-shelf connectors 20a-d be of the same type.

The inter-shelf connectors 220a-d secure the modular shelf 12 to the modular shelf 212. Each of the base ends 230, 234, 258, 262 and the top ends 232, 236, 260, 264 is modularly adapted to receive any one of the male connection ends 296 of any one of the inter-shelf connectors 220a-d. When the modular shelf 12 is stacked upon the modular shelf 212, a plurality of inter-shelf connectors 220 is used to secure the top ends 232, 236, 260, 264 of the modular shelf 212 to the base ends 30, 34, 58, 62 of the modular shelf 12. For example, as shown in FIG. 6, a first one of the inter-shelf connectors 220a secures the front-left top end 232 of the modular shelf 212 to the front-left base end 30 of the modular shelf 12, a second one of the inter-shelf connectors 220b secures the rear-left top end 236 of the modular shelf 212 to the rear-left base end 34 of the modular shelf 12, a third one of the inter-shelf connectors 220c secures the front-right top end 260 of the modular shelf 212 to the front-right base end 58 of the modular shelf 12, and a fourth one of the inter-shelf connectors 220d secures the rear-right top end 264 of the modular shelf 212 to the rear-right base end 62 of the modular shelf 12.

Referring to FIG. 7, a modular rack 310 can include a plurality of modular shelves, such as the modular shelf 12 and the modular shelf 212, as well as a peripheral device support subassembly 312. The peripheral device support subassembly 312 includes a rear-end panel 314 having a plurality of louvers 316, 316' formed therein in similar respect to the louvers 100, 100' depicted in FIGS. 2-4. The louvers 316, 316', like the louvers 100, 100', are adapted to receive the sliding mount bracket 110. The rear-end panel 314 may, in some embodiments of the invention, be formed from the same sheet of metal used to form the left-end panel 22 and/or the right-end panel 50.

The peripheral device support subassembly 312 further includes a plurality of leg members, such as left leg member 318 and right leg member 320. The left leg member 318 is preferably welded to the rear-end panel 314, extends vertically therefrom, and terminates at a hollow end, referenced herein as left base end 322. The peripheral support right leg member 320 is preferably welded to the rear-end panel 314, extends vertically therefrom, and terminates at a hollow end, referenced herein as a right-base end 324. The inter-shelf connectors 220 secure the peripheral device support subassembly 312 to the modular shelf 12. For example, a fifth one of the inter-shelf connectors 220e secures the left-base end 322 of the peripheral device support subassembly 312 to the rear-left top end 36 of the modular shelf 12, while a sixth one of the inter-shelf connectors 220f secures the right-base end 324 of the peripheral device support subassembly 312 to the rear-right top end 64 of the modular shelf 12. The intershelf connectors 220e-f are preferably similar in form and dimensions to intershelf connectors 220a-d. A peripheral device may be secured to the modular rack 10 by attaching the sliding mount bracket 110 to the peripheral device and inserting the sliding mount bracket 110 between the louvers 316, 316' of the rear-end panel 314.

Preferred embodiments of the modular rack 10, 210, 310, as well as related embodiments of the modular rack of the present invention, are powder-coated. Furthermore, the modular rack 10, 210, 310, as well as related embodiments of the modular rack of the present invention, are preferably adapted to support boxes and containers, such as the BIB container 92 shown in FIG. 7. In preferred embodiments of the invention, each modular shelf 12, 212 is adapted to support two to three BIB containers 92. However, the scope of the invention is not so limited.

Figure 8:
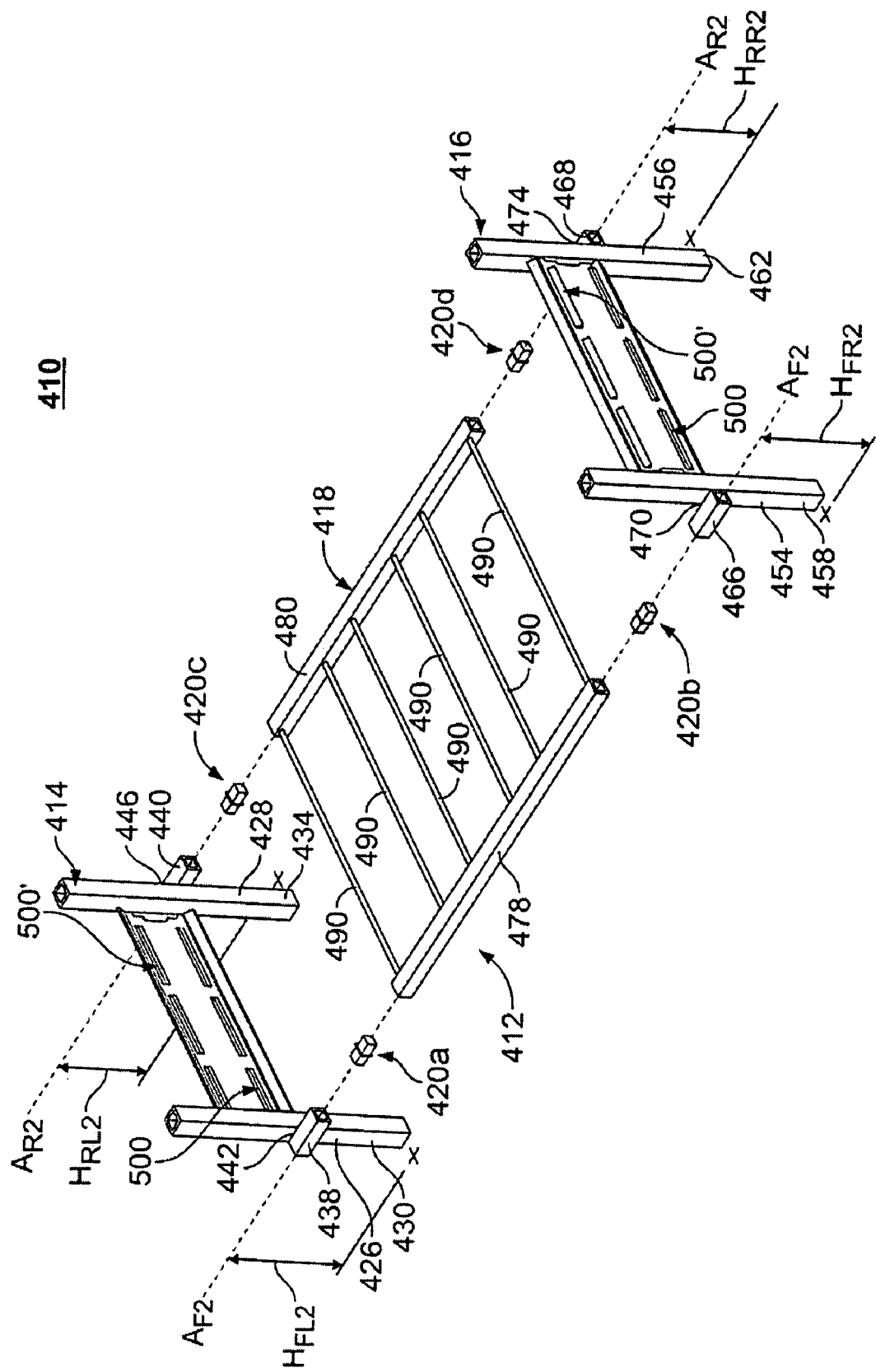
FIG. 8 is a horizontally-exploded perspective view showing a modular rack constructed in accordance with a second exemplary embodiment of the present invention, the modular rack including a single shelf of a level type.
Figure 9:
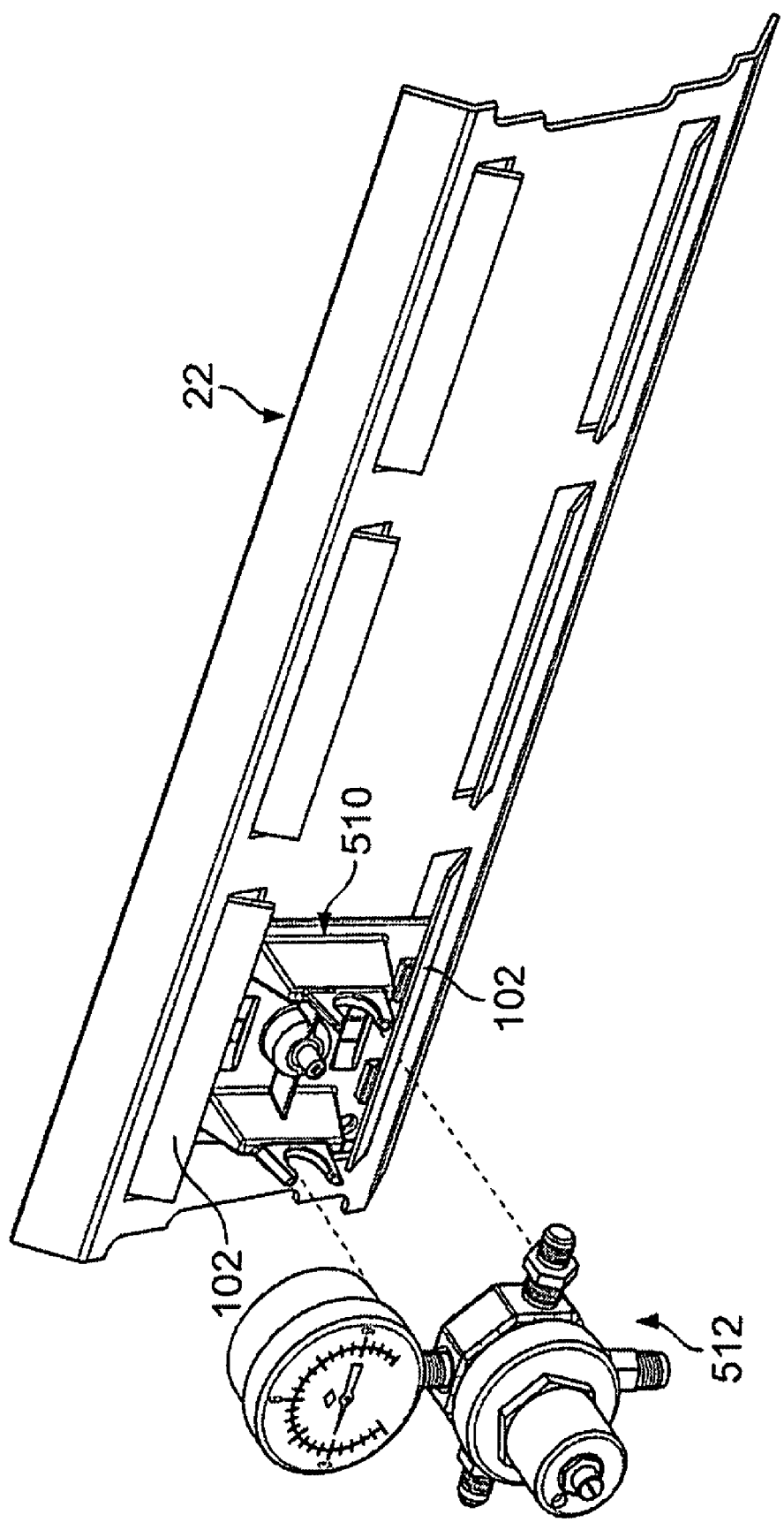
FIG. 9 is a partially exploded perspective view showing the left-end panel of FIGS. 2-5 with a regulator and a panel-mounted regulator bracket thereof.
Figure 10:
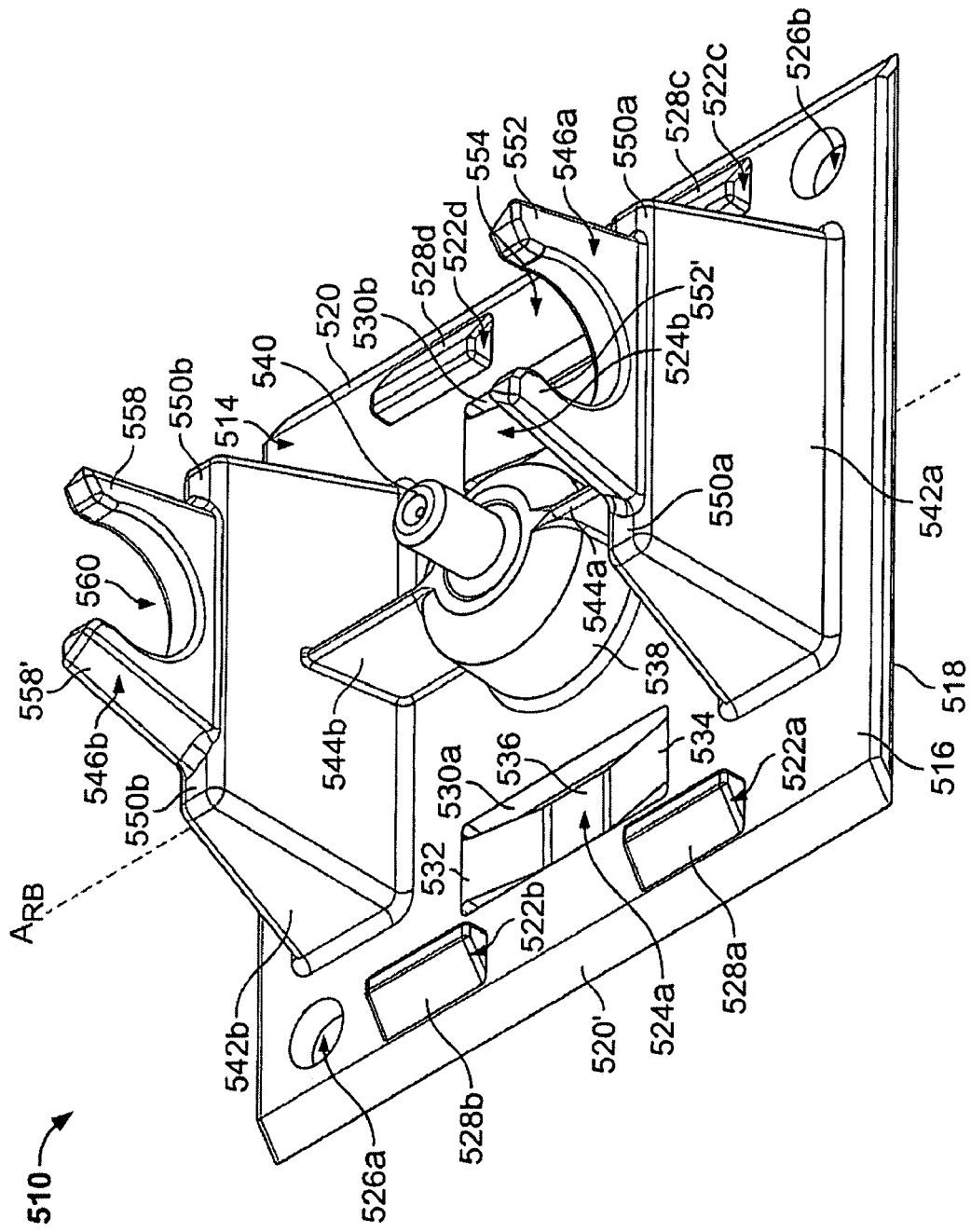
FIG. 10 is perspective view of the regulator bracket of FIG. 9.

Referring to FIG. 8, the modular rack 410 is shown and described in accordance with a second exemplary embodiment of the invention. Elements illustrated in FIG. 8 which correspond substantially to the elements described above with reference to FIG. 1 have been designated by corresponding reference numerals increased by four hundred. The embodiment of the present invention shown in FIG. 8 is constructed in manners consistent with the foregoing description of the modular rack 10 of FIGS. 1-7, unless it is stated otherwise.

The modular rack 410 includes a modular shelf 412 of the level type. The modular shelf 412 includes a left-end subassembly 414, a right-end subassembly 416, at least one middle subassembly 418, and a plurality of intra-shelf connectors 420a-d securing the middle subassembly 418 to the left-end subassembly 414 and to the right-end subassembly 416.

The left-end subassembly 414 includes a front-left leg member 426 having a hollow bottom end, referenced herein as a front-left base end 430, and a rear-left leg member 428 having a hollow bottom end, referenced herein as a rear-left base end 434. The left-end subassembly 414 further includes a front-left frame member 438 extending perpendicularly from the front-left leg member 426 along a front axis $A_{F2}$, and a rear-left frame member 440 extending perpendicularly from the rear-left leg member 428 along a rear axis $A_{R2}$. A front-left juncture point 442 is formed at the intersection of the front-left leg member 426 and the front-left frame member 438, and a rear-left juncture point 446 is formed at the intersection of the rear-left leg member 428 and the rear-left frame member 440.

The right-end subassembly 416 includes a front-right leg member 454 having a hollow bottom end, referenced herein as a front-right base end 458, and a rear-right leg member 456 having a hollow bottom end, referenced herein as a rear-right base end 462. The right-end subassembly 416 further includes a front-right frame member 466 extending perpendicularly from the front-right leg member 454 along the front axis $A_{F2}$, and a rear-right frame member 474 extending perpendicularly from the rear-right leg member 456 along the rear axis $A_{R2}$. A front-right juncture point 470 is formed at the intersection of the front-right leg member 454 and the front-right frame member 466, and a rear-right juncture point 474 is formed at the intersection of rear-right leg member 456 and the rear-right frame member 440.

As discussed above, the modular shelf 412 of FIG. 8 is of a level type for supporting BIB containers in a position that is substantially level with respect to ground level. In this regard, the distance between the front-left base end 430 and the front-left juncture point 442, referenced herein as distance $H_{FL2}$, is substantially equal to the distance between the rear-left base end 434 and the rear-left juncture point 446, which is referenced herein as distance $H_{RL2}$. Moreover, the distance between the front-right base end 458 and the front-right juncture point 470, referenced herein as distance $H_{FR2}$, is substantially equal to the distance between the rear-right base end 462 and the rear-right juncture point 474, which is referenced herein as distance $H_{RR2}$. In other words, the distances $H_{FL2}$, $H_{RL2}$, $H_{FR2}$, $H_{RR2}$ are substantially equal to one another.

Continuing with reference to FIG. 8, the middle subassembly 418 includes a front-middle frame member 478 extending along the front axis $A_{F2}$ and a rear-middle frame member 480 extending along the rear axis $A_{R2}$. The elevation of the front-middle frame member 478 is substantially equal to the elevation of the rear-middle frame member 480. The middle subassembly 418 further includes a plurality of support members 490 securing the front-middle frame member 478 to the rear-middle frame member 480. The support members 490 extend level with respect to the ground and extend perpendicularly with respect to the front-middle frame member 478 and the rear-middle frame member 480. In contrast to the support bars 90 of FIG. 1, the modular shelf 412 does not include stopping means 94. Notwithstanding, it may be desirable for some embodiments of the modular shelf 412 to include stopping means, and in this regard, embodiments of the modular shelf 412 are not limited so as to necessarily exclude stopping means 94 therefrom. It shall be understood that the modular rack 410 can include any suitable combination of the modular shelf 12 of FIG. 1, the modular shelf 212 of FIGS. 6 and 7, and the modular shelf 412 of FIG. 8.

Referring to FIGS. 9-16, the present invention provides for a novel type of sliding mount bracket, referenced herein as a regulator bracket 510, which is adapted to removably attach a regulator 512 to a rack having integrated mounting means, such as the modular rack 10. In discussing the regulator bracket 510 and the structural environment relating thereto, exemplary reference shall be made to the left-end panel 22 of FIGS. 2-4. However, it will be understood by one skilled in the art that the regulator bracket 510 is interchangeably attachable to the left-end panel 22, the right-end panel 50, and the rear-end panel 116. It will be further understood that reference made below to the left-end panel 22 is merely exemplary of a contemplated use of the regulator bracket 510, and that the regulator bracket 510 may be used in connection with any other compatible mounting structure.

Figure 14:
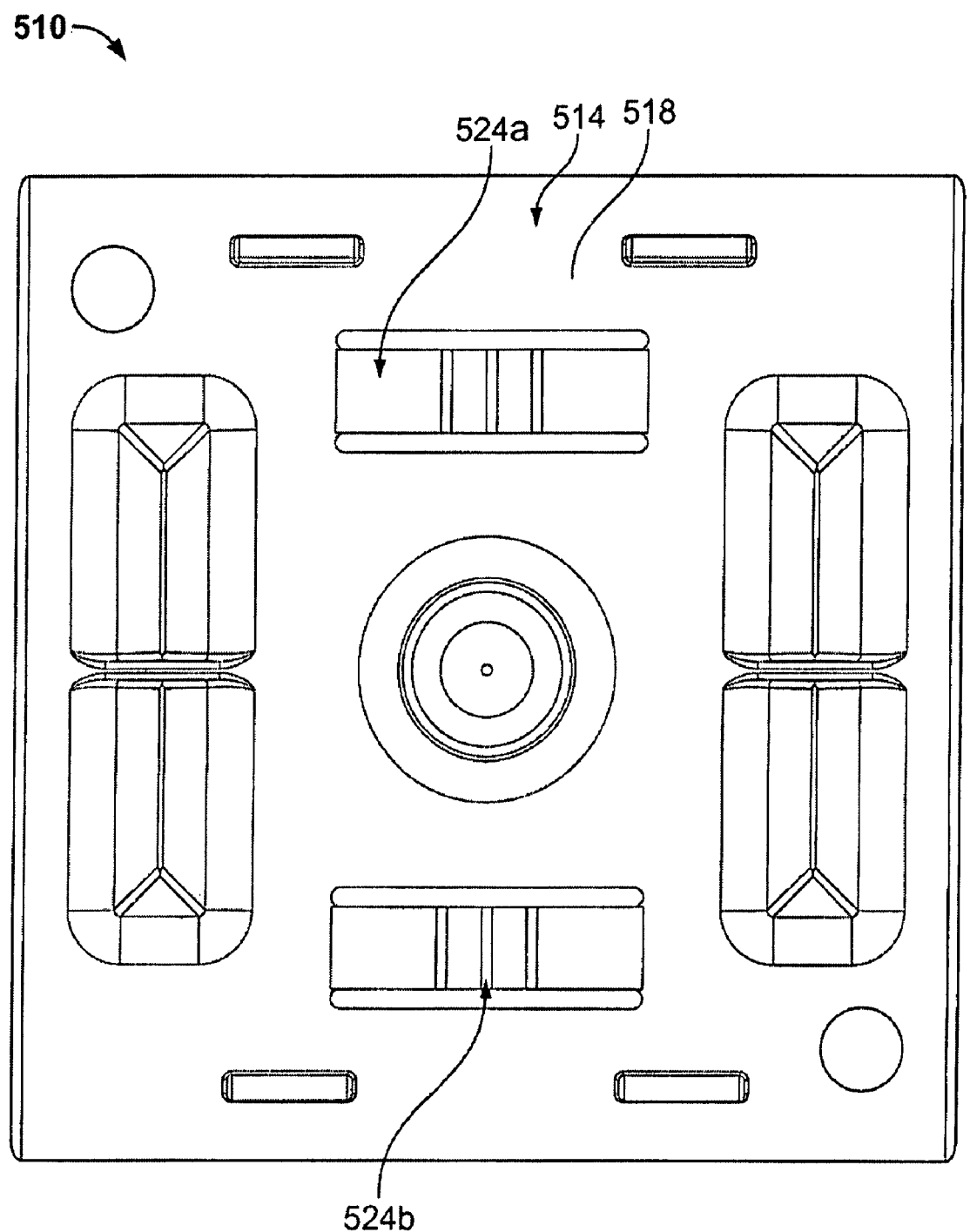
FIG. 14 is a bottom plan view of the regulator bracket of FIG. 9.

The regulator bracket 510 may be monolithically formed from an injection-molded plastic, such as acrylonitrile butadiene styrene (ABS), and, as evident from FIG. 14, many of the components of the regulator bracket 510 are formed to be hollow. The regulator bracket 510 includes a base 514, securing means for removable attachment of the base 514 to the left-end panel 22, and anchoring means for removable attachment of the base 514 to the regulator 512. The base 514, the securing means, and the anchoring means shall each be discussed in detail below.

Referring to FIGS. 10-14, the base 514 of the regulator bracket 510 is a substantially planar substrate that includes a front surface 516 and a rear surface 518 opposite the front surface 516. The base 514 further includes a pair of opposed longitudinal edges 520, 520', each extending from the front surface 516 of the base 514 to the rear surface 518 thereof. The base 514 is sized and dimensioned such that the longitudinal edges 520, 520' form a friction fit with the slats 102 of the louvers 100, 100' when the regulator bracket 510 is inserted into the receiving areas 106 of the louvers 100, 100'. In this regard, the longitudinal edges 520, 520' form a pair of angles $\theta_1$, $\theta_1'$ with respect to the rear surface 518, wherein the angles $\theta_1$, $\theta_1'$ are each substantially supplementary in magnitude with respect to the angles $\alpha$, $\alpha'$ of each louver slat 102 so to facilitate the formation of a friction fit between the edges 520, 520' and a corresponding one of the louver slats 102.

Continuing with reference to FIGS. 10-14, the exemplary securing means for attaching the base 514 to the left-end panel 22 includes a plurality of guide members 522a-d and/or a plurality of tension tabs 524a-b. The regulator bracket 510 also includes a plurality of mounting bores 526a-b. The guide members 522a-d, the tension tabs 524a-b, and the mounting bores 526a-b shall each be discussed in detail below.

Each one of the guide members 522a-d is formed from a protrusion on the front surface 516 of the base 514. The guide members 522a-d are positioned symmetrically with respect to a central longitudinal axis $A_{RB}$ of the regulator bracket 510, and each one of the guide members 522a-d has a corresponding inclined surface 528a-d, respectively, extending from the front surface 516. Each of the inclined surfaces 528a-b forms an angle $\theta_2$ with respect to the front surface 516, while the inclined surfaces 528c-d form an angle $\theta_2'$ with respect to the front surface 516. The angles $\theta_2$, $\theta_2'$ are substantially supplementary in magnitude relative to the angles $\alpha$, $\alpha'$, respectively, of the louver slats 102 so as to facilitate the formation of a friction fit between the guide members 522a-d and a corresponding one of the louver slats 102.

Regarding the tension tabs 524a-b, which are positioned symmetrically with respect to the central longitudinal axis $A_{RB}$ of the regulator bracket 510, each one is flanked by a pair of gaps 530a-b formed in the base of 514. Each one of the tension tabs 524a-b extends to and from the base 514 through one of the corresponding pair of gaps 530a-b. Each one of the tension tabs 524a-b includes a plurality of tab extension members 532, 534, each of which extends from the front surface 516 through one of the corresponding gaps 530a-b and protrudes past the rear surface 518. Each one of the tension tabs 524a-b further includes a tab contact member 536 extending between the ends of the tab extension members 532, 534 and protruding past the rear surface 518.

The tension tabs 524a-b are resiliently flexible. In this regard, when the base 514 is received by the louvers 100, 100', the tension tabs 524a-b urge the edges 520, 520' and the inclined surfaces 528a-d against the slats 102, thereby forming friction fits therewith. Also, each contact member 536 forms a friction fit with the outside surface 108 of an end panel (e.g., the left-end panel 22 of modular rack 10), such that the base 514 is inhibited from motion with respect to the left-end panel 22, unless and until the restaurateur or another party removes the regulator bracket 510 from the louvers 100, 100'.

Continuing with reference to FIGS. 10-14, the mounting bores 526a-b are formed through the base 514, such that each one of the mounting bores 526a-b is formed at a corner diagonally opposite from the other one of the mounting bores 526ab. Each one of the mounting bores 526a-b is sized and dimensioned to receive fasteners, e.g., mounting screws (not shown). In this regard, the regulator bracket 510 is adapted to be mounted to structures not having integrated mounting means (e.g., a wall, etc.).

Continuing with reference to FIGS. 10-14, the exemplary anchoring means for attaching the base 514 to the regulator 512 include a cylindrical boss 538, a cylindrical lug 540, a pair of supporting members 542a-b, a pair of ribs 544a-b, and/or a pair of regulator seats 546ab. The cylindrical boss 538, the cylindrical lug 540, the supporting members 542a-b, the ribs 544a-b, and the regulator seats 546a-b shall each be discussed in detail below.

The cylindrical boss 538 extends from the front surface 516 of the base 514 at a midpoint thereof along the central longitudinal axis $A_{RB}$, and the cylindrical lug 540 extends from a surface of the cylindrical boss 538 opposite the front surface 516 of the base 514. As will be discussed in detail below with reference to FIGS. 15 and 16, the cylindrical lug 540 is sized and dimensioned to be received within a recess 548 formed in the regulator 512, and the cylindrical boss 538 is sized and dimensioned to seat the regulator 512 at a distance spaced from the front surface 516 of the base 514.

Continuing with reference to FIGS. 10-14, the supporting members 542a-b are aligned along the central longitudinal axis $A_{RB}$ of the regulator bracket 510 and positioned equidistantly from the cylindrical boss 538. Each one of the supporting members 542a-b includes a plurality of trapezoidal side surfaces that extend from the front surface 516 of the base 514 and taper to form a corresponding one of a plurality of tapered ends 550a-b opposite the front surface 516. The rib 544a is monolithically formed with the base 514 along the central longitudinal axis $A_{RB}$ and extends between the supporting member 542a and the cylindrical boss 538. Similarly, the rib 544b is monolithically formed with the base 514 along the central longitudinal axis $A_{RB}$ and extends between the supporting member 542b and the cylindrical boss 538.

Figure 11:
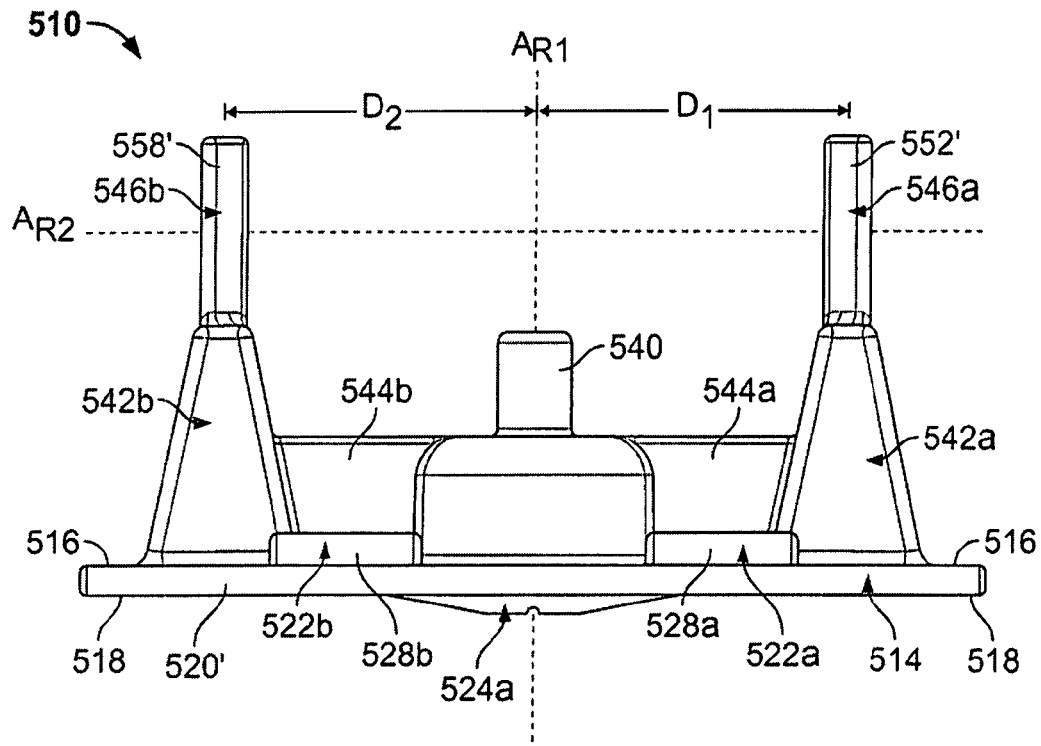
FIG. 11 is a front elevational view of the regulator bracket of FIG. 9, a rear elevational view of the regulator bracket being a mirror image thereof.
Figure 12:
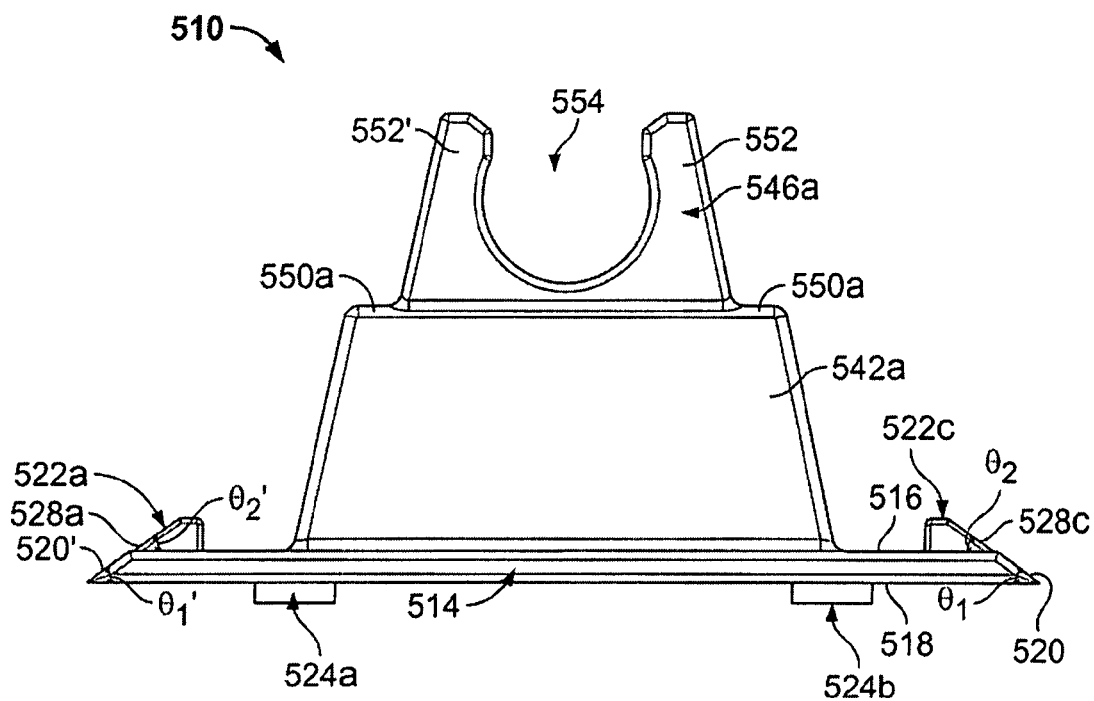
FIG. 12 a right side elevational view of the regulator bracket of FIG. 9, a left side elevational view of the regulator bracket being a mirror image thereof.
Figure 13:
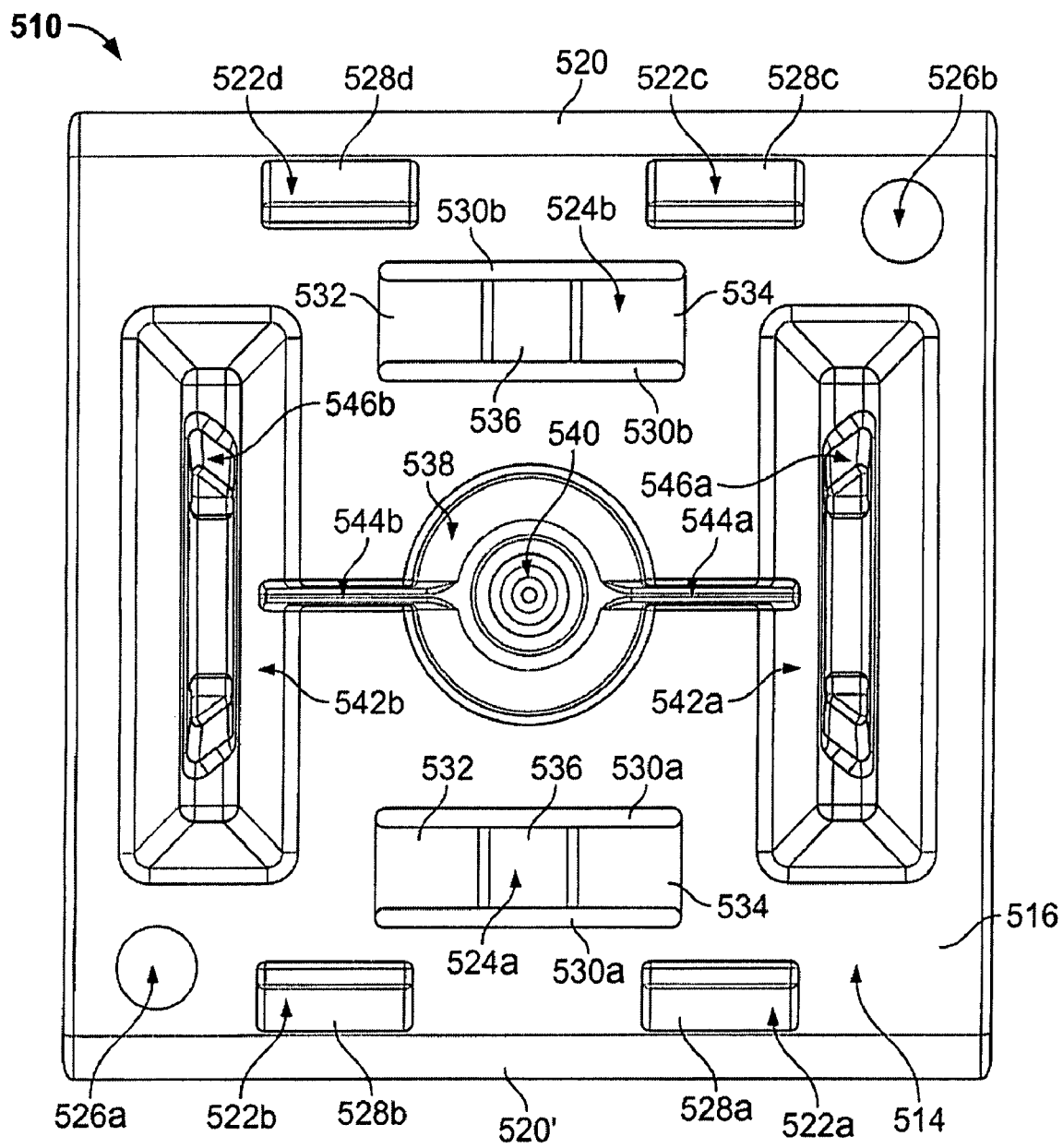
FIG. 13 is a top plan view of the regulator bracket of FIG. 9.

The regulator seat 546a extends from the tapered end 550a of the supporting member 542a, while the regulator seat 546b extends from the tapered end 550b of the supporting member 542b. Each one of the regulator seats 546a-b is positioned equidistantly from a midpoint along the central longitudinal axis $A_{RB}$. More particularly, as shown in FIG. 11, the regulator seat 546a is positioned from the midpoint at a distance $D_1$, and the regulator seat 546b is positioned from the midpoint at a distance $D_2$, which is equal to the distance $D_1$.

As will be further discussed below with reference to FIGS. 15 and 16, each one of the regulator seats 546a-b is sized and dimensioned to securely receive a fitting of the regulator 512. More particularly, the regulator seat 546a includes a first pair of opposing fingers 552, 552' that form a first open area 554 for receiving a first generally cylindrical fitting 556 of the regulator 512, while the regulator seat 546b includes a second pair of opposing fingers 558, 558' that form a second open area 560 for receiving a second generally cylindrical fitting 562 of the regulator 512. The first pair of opposing fingers 552, 552' and the second pair of opposing fingers 558, 558' are resiliently flexible, and, as discussed below, are adapted to form a snap-fit with the fittings 556, 562, respectively, of the regulator 512.

Figure 15:
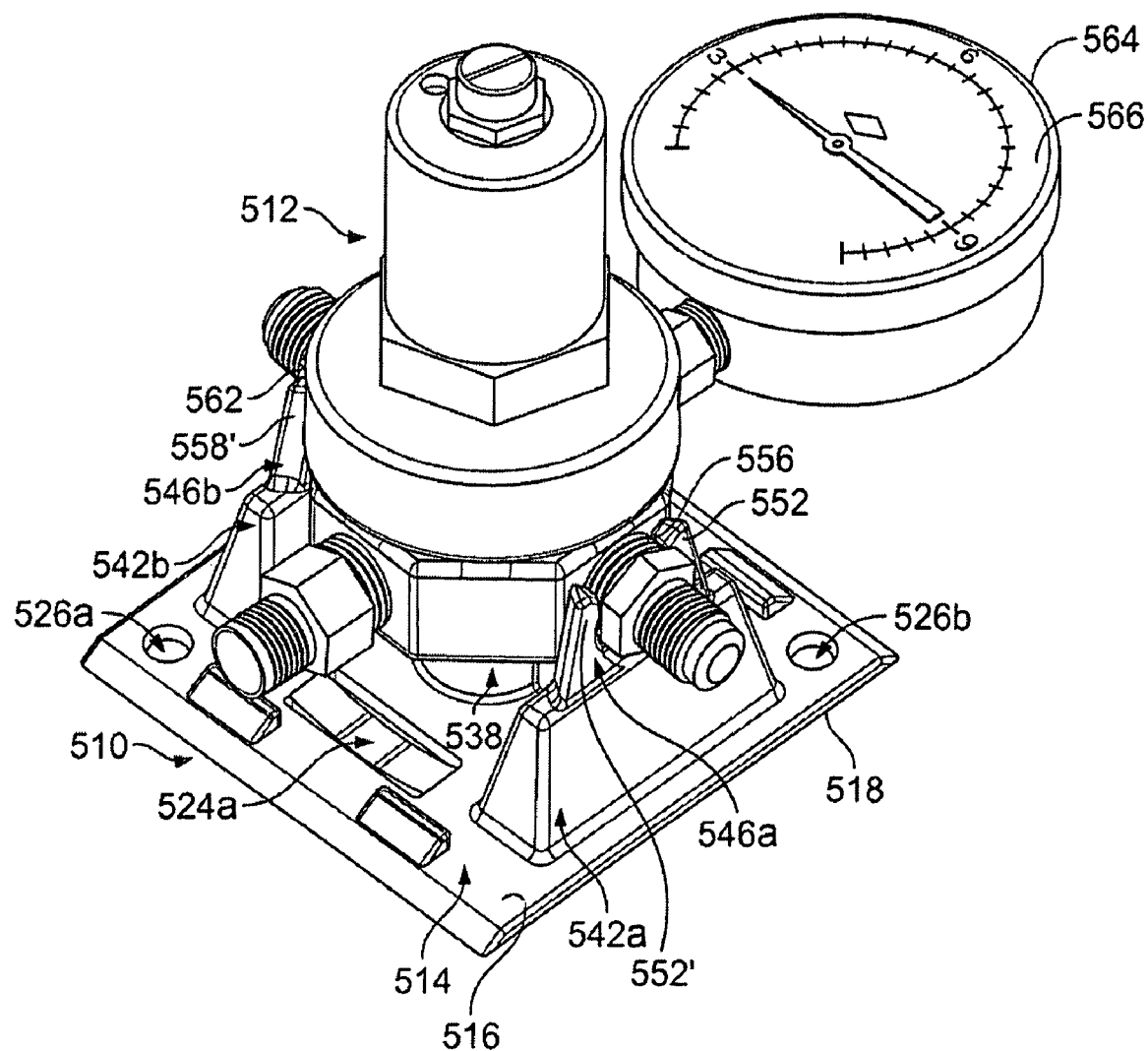
FIG. 15 is a perspective view showing the regulator and regulator bracket of FIG. 9 in their assembled state.
Figure 16:
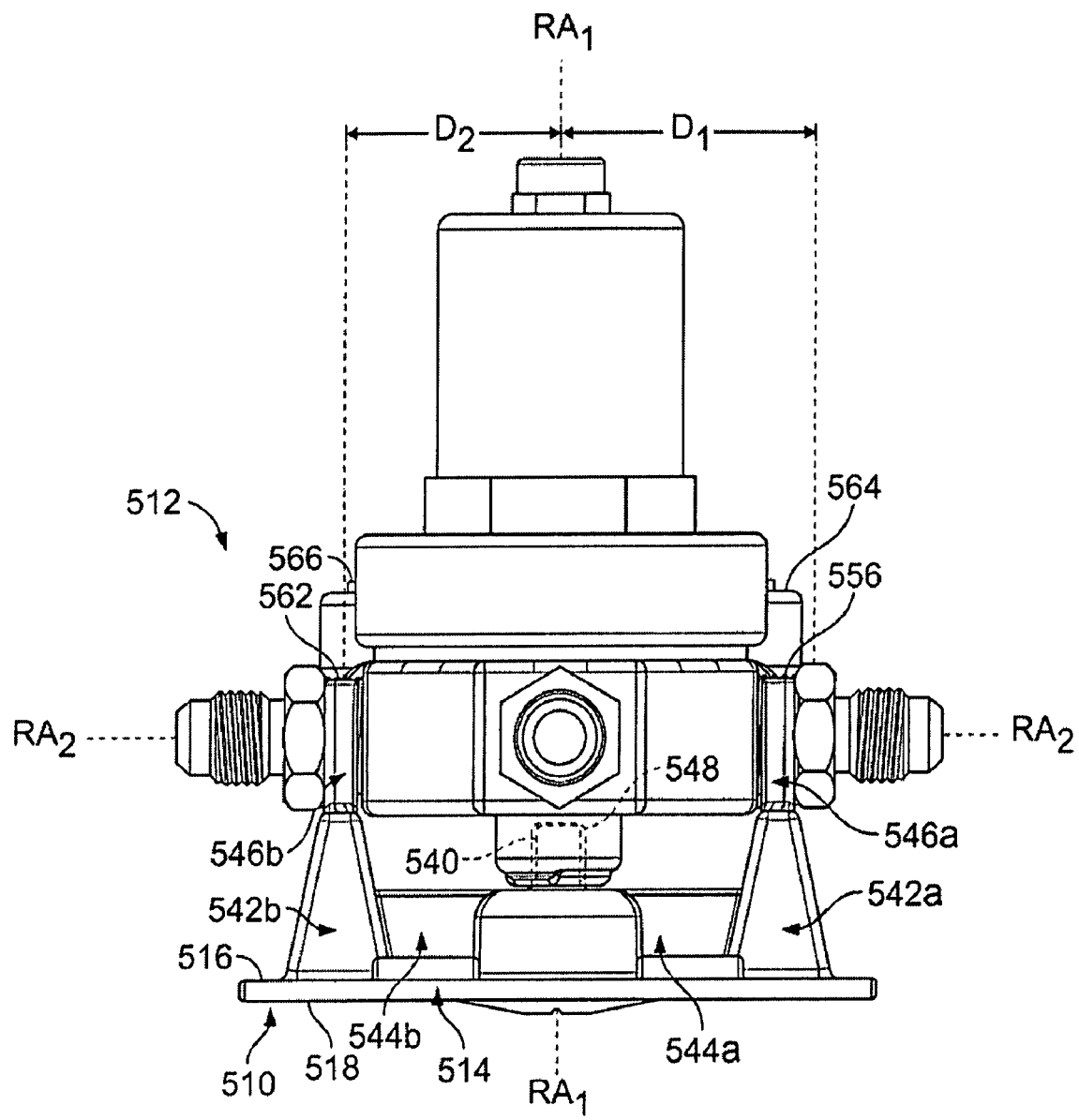
FIG. 16 is a front elevational view of the assembly of FIG. 15.

Referring to FIGS. 15 and 16, the regulator bracket 510 shall now be further discussed with reference being made to the regulator 512 attached thereto. As indicated above, the regulator 512 includes the recess 548 for receiving the lug 540, the first fitting 556 adapted to be received in the first open area 554, and the second fitting 562 adapted to be received in the second open area 560. More particularly, the first fitting 556 is positioned the distance $D_1$ from an axis $RA_1$ aligned with the recess 548, and the second fitting 562 is positioned the distance $D_2$ from the axis $RA_1$, such that the recess 548, the first fitting 556, and the second fitting 562 are each aligned with the central longitudinal axis $A_{RB}$ when attached to the regulator bracket 510.

The regulator 512 also includes a pressure gauge 564 having a display surface 566 with visually-perceptible indicia disposed thereon (e.g., pressure measurements). It is desirable for the display surface 566 to be in a position facing away from the base 514 of the regulator bracket 510 and, as such, it is desirable for movement of the regulator 512 to be inhibited so as to maintain such position. In this regard, the fingers 552, 552' and 558, 558' cooperate to inhibit motion of the regulator 512 in at least two dimensions. More particularly, the fingers 552, 552' and 558, 558' cooperate to inhibit motion of the regulator 512 away from the regulator bracket 510 in a direction along the axis $RA_1$, and further cooperate to inhibit motion of the regulator 512 in a direction perpendicular to both the axes $RA_1$ and $A_{RB}$. At the same time, the recess 548 in the regulator 512 and the lug 540 of the regulator bracket 510 cooperate to inhibit linear motion of the regulator 512 in a direction along an axis designated in FIG. 11 as axis $RA_2$. The recess 548 and the lug 540 further cooperate to inhibit rotational motion of the regulator 512 in a direction about the axis $RA_1$. Under such circumstances, the pressure gauge 564 is maintained in a position generally parallel to the front surface 516 of the base 514, and the display surface 566 is maintained in a position facing away from the base 514 and any structure to which the base 514 is attached (e.g., the left-end panel 22).

Figure 17:
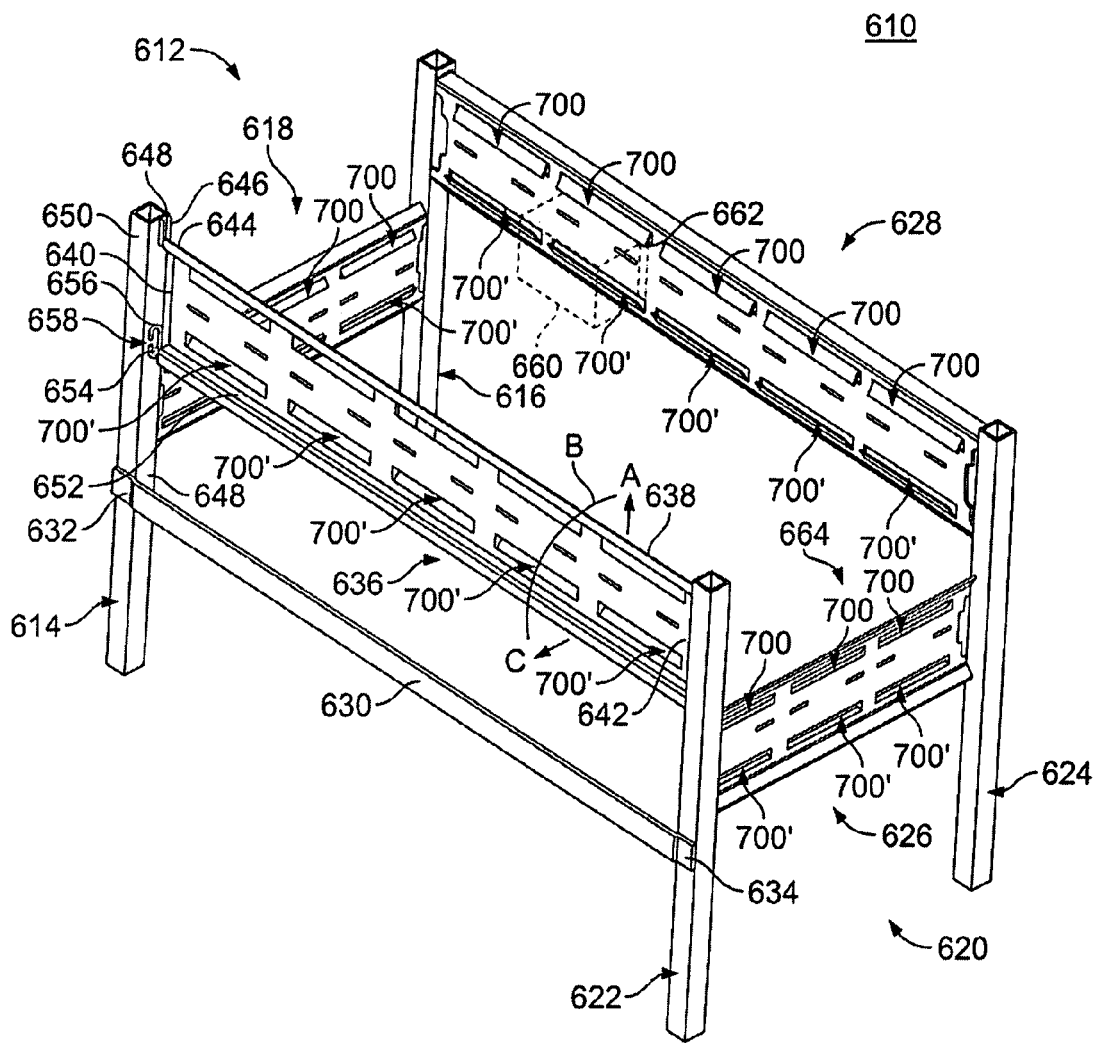
FIG. 17 is a perspective view showing a modular rack constructed in accordance with a third exemplary embodiment of the present invention.

Referring to FIG. 17, a modular rack 610 is shown and described in accordance with a third exemplary embodiment of the invention. The modular rack 610 includes a left-end subassembly 612 having front and rear-left leg member 614, 616 and a left-end panel 618 which is welded to middle portions of the front and rear-left leg members 614, 616, thereby providing structural rigidity to the left-end subassembly 612. The modular rack 610 also includes a right-end subassembly 620 having front and rear-right leg member 622, 624, and a right-end panel 626 which is welded to middle portions of front and rear-right leg member 622, 624, thereby providing structural rigidity to the right-end subassembly 620. A rear-end panel 628 is welded to upper portions of the rear-left and right leg member 616, 624. Further structural rigidity is provided by a bar 630 which has one end 632 welded to front-left leg member 614 and the other end 634 welded to front-right leg member 622.

Continuing with reference to FIG. 17, a front-end panel 636 is movably positioned between the front-left and the front-right leg members 614, 622 of the modular rack 610. More particularly, a bar 638 is fitted to the top of the front-end panel 636. The bar 638 projects horizontally beyond ends 640, 642 of the front-end panel 636, thereby forming a pin-like projection 644 that projects toward left-front leg member 614, and another pin-like projection (not shown) that projects toward front-right leg member 622. Alternatively, two pins (not shown) may be fitted to ends 640, 642 of the front end panel 636, so as to project horizontally beyond said ends 640, 642. The following discussion is directed to elements that are on or near front-left leg 614 and visible in FIG. 17. It should be noted that front-right leg 622 is a mirror-image of front-left leg 614, and has counterpart elements thereto, although such elements are not visible in FIG. 17. Thus, the discussion of the various elements in relation to front-left leg 614 also apply to the unseen counterpart elements of or near front-right leg 622.

The projection 644 is removably positioned in a U-shaped receptacle 646, which has an upward-facing opening 648. The receptacle 646 is welded onto a surface 648 of the front-left member 614, proximate upper end 650 thereof. Likewise, a bar 652 is fitted to the bottom of the front-end panel 636. The bar 652 projects horizontally beyond ends 640, 642 of the front-end panel 636, thereby forming a pin-like projection 654 that projects toward left-front leg member 614, and another pin-like projection (not shown) that projects toward front-right leg member 622. Alternatively, two pins (not shown) may be fitted to the ends 640, 642 of the front-end panel 636, so as to project horizontally beyond said ends 640, 642. The projection 654 is removably positioned in an oval-shaped receptacle 656, which has a side-facing opening 658 formed therein. The receptacle 656 is welded onto the surface 648 of the front-left leg member 614, proximate the upper end 650 thereof. The receptacles 646, 656 may be fabricated from chain-link-shaped metal rods, although other suitable materials and fittings that are known in the art, such as latches and catches, may also be utilized to removably support the front-end panel 636.

Still referring to FIG. 17, the left and right-end panels 612, 620, respectively, the rear-end panel 628, and the front-end panel 636 all include mounting means for securing a peripheral device 660 (shown in phantom) thereto. More particularly, the mounting means includes louvers 700, 700' like the louvers 100, 100', formed in the left and right-end panels 612, 620, the rear-end panel 628 and the front-end panel 636. The louvers 700, 700' are sized and positioned to receive a sliding mount bracket 662 (shown in phantom). The louvers 700, 700' are oriented so to protrude inwardly, towards the interior confines 664 of the modular rack 610, thereby permitting peripheral devices to be mounted, within the interior of the modular rack 610.

Should the restaurateur wish to access, add, delete, service or view peripheral devices that are mounted interiorly within the modular rack 610, he or she may do so in a manner described herein. The front-end panel 636 may be removed from the modular rack 610 by raising the panel 636 (see arrow A) until the projection 644 and its counterpart element (not shown) at the opposite end (not shown) of bar 638 on front-right leg member 622 are positioned above the opening 648 of the receptacle 646 of front-left leg member 614 and its counterpart element 646. The panel 636 is then rotated outwardly, approximately 90 degrees (see arrow B). The front-end panel 636 may then be completely removed from the modular rack 610 by pulling the panel 636 outwardly (see arrow C) such that the projection 654 that is located adjacent to front-left leg 614 is positioned outside of the opening 658 of the receptacle 656. Similarly, the counterpart element (not shown) of projection 654 that is located adjacent to the front-right leg 622 is removed to a position outside of the counterpart element (not shown) of the opening 658 of the receptacle 656.

Figure 18:
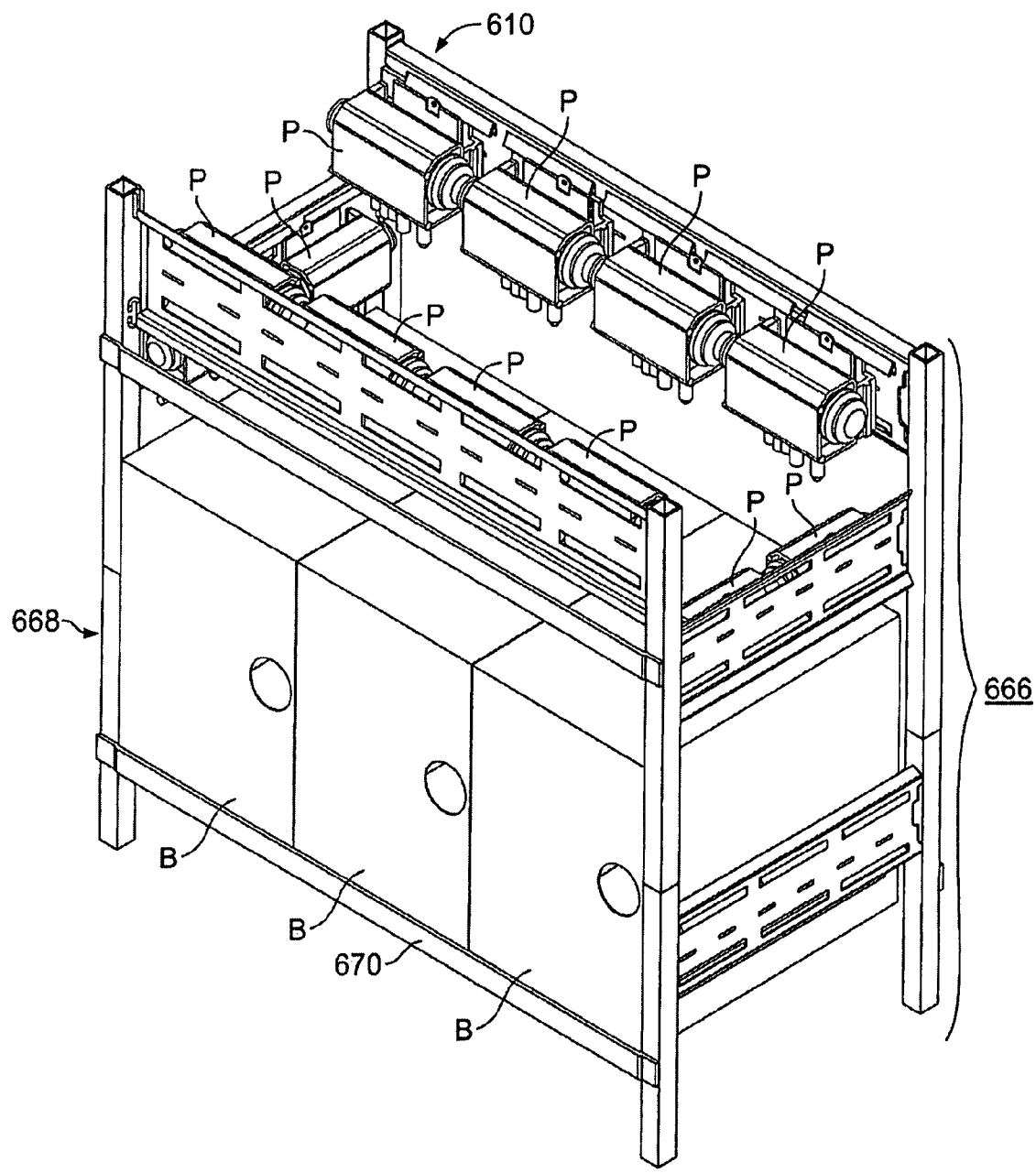
FIG. 18 is a perspective view of the modular rack of FIG. 17 mounted on a BIB rack and having peripheral devices mounted thereupon.

In operation, while still referring to FIG. 17, the modular rack 610 of the third embodiment may be positioned on the floor, with modular rack(s) of the first and/or second embodiments stacked thereupon (not shown). Preferably, the modular rack 610 of the third embodiment may be stacked upon a modular rack of the first or second embodiment, or upon a modular rack of the type shown in FIG. 18 which shows a modular rack 666, which comprises the modular rack 610 of FIG. 17 mounted on a BIB rack 668. BIB rack 668 is similar to the BIB rack 410 of FIG. 8, except that the components of the BIB rack are welded together, rather than being joined by inter-shelf connectors, such as the connectors 420a-d of FIG. 8, thus providing rigidity to the structure and making it non-expandable. Also, a single bar 670 is substituted for the front-left frame member 438, the front-right frame member 466, and the front middle-frame member 478 of BIB rack 410. The BIB rack 666 is, however, a modular unit and may be connected vertically to the modular rack 610 by inter-shelf connectors such as connectors 220a-d of the modular rack 210 that is illustrated in FIG. 6.

It will be understood that the embodiments of the present invention described herein are merely exemplary and that a person skilled in the art may make many variations and modifications without departing from the spirit and the scope of the invention. All such variations and modifications, including those discussed above, are intended to be included within the scope of the invention.

What is claimed is:

1. A bracket for mounting a gas pressure regulator, said bracket comprising a bracket body including a first edge that is adapted to be received within and slide along a first receiving structure, a second edge that is adapted to be received within and slide along a second receiving structure, a back surface, and a front surface that faces away from said back surface; a pair of seats extending away from said front surface, each seat being adapted to receive a cylindrical work piece; and a lug extending away from said front surface.

2. The bracket of claim 1, further comprising a boss situated between said front surface and said lug, said boss providing support to said lug.

3. The bracket of claim 2, further comprising a rib extending from said boss to one of said seats.

4. A bracket for mounting a gas pressure regulator, said bracket comprising a bracket body including a first edge that is adapted to be received within and slide along a first receiving structure, a second edge that is adapted to be received within and slide along a second receiving structure, a back surface, and a front surface that faces away from said back surface; and a pair of seats extending away from said front surface, each seat being adapted to receive a cylindrical work piece, at least one of said seats having a pair of fingers that form an opening and that securely grasp the cylindrical workpiece when the cylindrical workpiece is situated within said opening.

5. The bracket of claim 4, wherein at least one of said seats is supported by a rib continuous with said front surface.

6. The bracket of claim 1, further comprising at least one guide member proximal to said first edge and extending outwardly from said front surface, and at least another guide member proximal to said second edge and extending outwardly from said front surface, each of said guide members being shaped to conform to the first receiving structure.

7. A bracket for mounting a gas pressure regulator, said bracket comprising a bracket body including a first edge that is adapted to be received within and slide along a first receiving structure, a second edge that is adapted to be received within and slide along a second receiving structure, a back surface, and a front surface that faces away from said back surface, said bracket body defining an opening; a pair of seats extending away from said front surface, each seat being adapted to receive a cylindrical work piece; and a tension tab including a tab contact member having two opposed edges and a pair of resilient tab extension members, each of said tab extension members being attached to one of said edges of said tab contact member and to said bracket body at the perimeter of said opening, said tab contact member and said tab extension members being arranged such that said tab contact member resides outside of said bracket body proximal to said back surface and is movable toward said opening when pressure is applied to said tab contact member in the direction of said back surface.

8. The bracket of claim 1, wherein said first and second edges are beveled to conform to of the first and second receiving structures, respectively.

\* \* \* \* \*